US008846819B2

(12) United States Patent
Chen et al.

(10) Patent No.: US 8,846,819 B2
(45) Date of Patent: Sep. 30, 2014

(54) CORE-FIRST NANOPARTICLE FORMATION PROCESS, NANOPARTICLE, AND COMPOSITION

(75) Inventors: Yaohong Chen, Akron, OH (US); Mindaugas Rackaitis, Massillon, OH (US); Xiaorong Wang, Hudson, OH (US); Hideki Kitano, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 21 days.

(21) Appl. No.: 13/142,770

(22) PCT Filed: Dec. 29, 2009

(86) PCT No.: PCT/US2009/069680
§ 371 (c)(1),
(2), (4) Date: Feb. 2, 2012

(87) PCT Pub. No.: WO2010/078320
PCT Pub. Date: Jul. 8, 2010

(65) Prior Publication Data
US 2012/0132346 A1 May 31, 2012

Related U.S. Application Data

(60) Provisional application No. 61/141,942, filed on Dec. 31, 2008.

(51) Int. Cl.
*C08F 287/00* (2006.01)
*C08L 9/06* (2006.01)
*B60C 1/00* (2006.01)

(52) U.S. Cl.
CPC ............... *C08F 287/00* (2013.01); *C08L 9/06* (2013.01); *B60C 1/0016* (2013.04); *Y10S 525/902* (2013.01); *Y10S 977/773* (2013.01)
USPC ........ 525/332.9; 525/902; 525/242; 525/232; 525/386; 977/773

(58) Field of Classification Search
CPC ........ B60C 1/0016; C08F 287/00; C08L 9/06
USPC ........ 525/902, 242, 232, 332.9, 386; 977/773
See application file for complete search history.

(56) References Cited

U.S. PATENT DOCUMENTS

| 2,531,396 A | 11/1950 | Carter et al. |
|---|---|---|
| 3,177,186 A | 4/1965 | Miller |
| 3,598,884 A | 8/1971 | Wei et al. |
| 3,793,402 A | 2/1974 | Owens |
| 3,840,620 A | 10/1974 | Gallagher |
| 3,927,143 A | 12/1975 | Makowski et al. |
| 3,972,963 A | 8/1976 | Schwab et al. |
| 4,075,186 A | 2/1978 | Ambrose et al. |
| 4,233,409 A | 11/1980 | Bulkley |
| 4,247,434 A | 1/1981 | Vanderhoff et al. |
| 4,248,986 A | 2/1981 | Lai et al. |
| 4,326,008 A | 4/1982 | Rembaum |
| 4,386,125 A | 5/1983 | Shiraki et al. |
| 4,408,018 A | 10/1983 | Bartman et al. |
| 4,417,029 A | 11/1983 | Milkovich |
| 4,463,129 A | 7/1984 | Shinada et al. |
| 4,471,093 A | 9/1984 | Furukawa et al. |
| 4,543,403 A | 9/1985 | Isayama et al. |
| 4,598,105 A | 7/1986 | Weber et al. |
| 4,600,749 A | 7/1986 | Minekawa et al. |
| 4,602,052 A | 7/1986 | Weber et al. |
| 4,617,346 A | 10/1986 | Sonoda |
| 4,659,782 A | 4/1987 | Spinelli |
| 4,659,790 A | 4/1987 | Shimozato et al. |
| 4,717,655 A | 1/1988 | Fulwyler |
| 4,722,770 A | 2/1988 | Blottiere et al. |
| 4,725,522 A | 2/1988 | Breton et al. |
| 4,764,572 A | 8/1988 | Bean, Jr. |
| 4,773,521 A | 9/1988 | Chen |
| 4,774,189 A | 9/1988 | Schwartz |
| 4,788,254 A | 11/1988 | Kawakubo et al. |
| 4,798,691 A | 1/1989 | Kasai et al. |
| 4,829,130 A | 5/1989 | Licchelli et al. |

(Continued)

FOREIGN PATENT DOCUMENTS

| CA | 2127919 A1 | 3/1995 |
|---|---|---|
| CN | 1560094 A | 1/2005 |

(Continued)

OTHER PUBLICATIONS

Min et al. Macromolecules 2007, 40, 7217-7222.*
Awan et a. Journal of POlymer Science Part A Polymer Chemistry 1996, 34, 2633-2649.*
Schwab et al. Anionic Dispersion Polymerization Advances in Polymer Synthesis 31, 381-404, 1985.*
Hofler, Thomas, May 22, 2012 Supplementary European Search Report with Opinion from European Patent Application No. 09837105.7 (5 pp.).
Bradley, Melanie et al., "Poly(vinylpyridine) Core/Poly(N-isopropylacrylamide) Shell Microgel Particles: Their Characterization and the Uptake and Release of an Anionic Surfactant", Langmuir, vol. 24, pp. 2421-2425 (Mar. 14, 2008).
Park, Jong Chul, International Search Report with Written Opinion from PCT/US2009/069680, 8 pp. (Aug. 3, 2010).
Akashi, Mitsuru et al., "Synthesis and Polymerization of a Styryl Terminated Oligovinylpyrrolidone Macromonomer", Die Angewandte Makromolekulare Chemie, 132, pp. 81-89 (1985).

(Continued)

*Primary Examiner* — Mark Kaucher
(74) *Attorney, Agent, or Firm* — Meredith E. Hooker; Nathan T. Lewis

(57) ABSTRACT

A method is provided for synthesizing a core-shell nanoparticle that includes the following steps: providing a polymeric seed (in a solvent) that includes a mono-vinyl monomer cross-linked with a cross-linking agent to form the core of the nanoparticle, the core has an average diameter of from about nanometers to about 10,000 nanometers, and the core has polymer chains with living ends; adding a stabilizer to stabilize the seed and prevent the seed from precipitating out of solution; and grafting a shell species onto the living ends of the core to form the shell of the nanoparticle. A core-first synthesized nanoparticle, along with a rubber composition and tire product are also provided.

25 Claims, 2 Drawing Sheets

(56) References Cited

U.S. PATENT DOCUMENTS

| | | | |
|---|---|---|---|
| 4,829,135 | A | 5/1989 | Gunesin et al. |
| 4,837,274 | A | 6/1989 | Kawakubo et al. |
| 4,837,401 | A | 6/1989 | Hirose et al. |
| 4,861,131 | A | 8/1989 | Bois et al. |
| 4,870,144 | A | 9/1989 | Noda et al. |
| 4,871,814 | A | 10/1989 | Gunesin et al. |
| 4,904,730 | A | 2/1990 | Moore et al. |
| 4,904,732 | A | 2/1990 | Iwahara et al. |
| 4,906,695 | A | 3/1990 | Blizzard et al. |
| 4,920,160 | A | 4/1990 | Chip et al. |
| 4,942,209 | A | 7/1990 | Gunesin |
| 4,987,202 | A | 1/1991 | Zeigler |
| 5,036,138 | A | 7/1991 | Stamhuis et al. |
| 5,066,729 | A | 11/1991 | Stayer, Jr. et al. |
| 5,073,498 | A | 12/1991 | Schwartz et al. |
| 5,075,377 | A | 12/1991 | Kawabuchi et al. |
| 5,120,379 | A | 6/1992 | Noda et al. |
| 5,130,377 | A | 7/1992 | Trepka et al. |
| 5,169,914 | A | 12/1992 | Kaszas et al. |
| 5,183,851 | A | 2/1993 | Visani et al. |
| 5,194,300 | A | 3/1993 | Cheung |
| 5,219,945 | A | 6/1993 | Dicker et al. |
| 5,227,419 | A | 7/1993 | Moczygemba et al. |
| 5,237,015 | A | 8/1993 | Urban |
| 5,241,008 | A | 8/1993 | Hall |
| 5,247,021 | A | 9/1993 | Fujisawa et al. |
| 5,256,736 | A | 10/1993 | Trepka et al. |
| 5,262,502 | A | 11/1993 | Fujisawa et al. |
| 5,290,873 | A | 3/1994 | Noda et al. |
| 5,290,875 | A | 3/1994 | Moczygemba et al. |
| 5,290,878 | A | 3/1994 | Yamamoto et al. |
| 5,296,547 | A | 3/1994 | Nestegard et al. |
| 5,298,559 | A * | 3/1994 | Fujii et al. .................. 525/67 |
| 5,329,005 | A | 7/1994 | Lawson et al. |
| 5,331,035 | A | 7/1994 | Hall |
| 5,336,712 | A | 8/1994 | Austgen, Jr. et al. |
| 5,362,794 | A | 11/1994 | Inui et al. |
| 5,395,891 | A | 3/1995 | Obrecht et al. |
| 5,395,902 | A | 3/1995 | Hall |
| 5,399,628 | A | 3/1995 | Moczygemba et al. |
| 5,399,629 | A | 3/1995 | Coolbaugh et al. |
| 5,405,903 | A | 4/1995 | Van Westrenen et al. |
| 5,421,866 | A | 6/1995 | Stark-Kasley et al. |
| 5,436,298 | A | 7/1995 | Moczygemba et al. |
| 5,438,103 | A | 8/1995 | DePorter et al. |
| 5,447,990 | A | 9/1995 | Noda et al. |
| 5,462,994 | A | 10/1995 | Lo et al. |
| 5,514,734 | A | 5/1996 | Maxfield et al. |
| 5,514,753 | A | 5/1996 | Ozawa et al. |
| 5,521,309 | A | 5/1996 | Antkowiak et al. |
| 5,525,639 | A | 6/1996 | Keneko et al. |
| 5,527,870 | A | 6/1996 | Maeda et al. |
| 5,530,052 | A | 6/1996 | Takekoshi et al. |
| 5,534,592 | A | 7/1996 | Halasa et al. |
| 5,580,925 | A | 12/1996 | Iwahara et al. |
| 5,587,423 | A | 12/1996 | Brandstetter et al. |
| 5,594,072 | A | 1/1997 | Handlin, Jr. et al. |
| 5,614,579 | A | 3/1997 | Roggeman et al. |
| 5,627,252 | A | 5/1997 | De La Croi Habimana |
| 5,674,592 | A | 10/1997 | Clark et al. |
| 5,686,528 | A | 11/1997 | Wills et al. |
| 5,688,856 | A | 11/1997 | Austgen, Jr. et al. |
| 5,700,897 | A | 12/1997 | Klainer et al. |
| 5,707,439 | A | 1/1998 | Takekoshi et al. |
| 5,728,791 | A | 3/1998 | Tamai et al. |
| 5,733,975 | A | 3/1998 | Aoyama et al. |
| 5,739,267 | A | 4/1998 | Fujisawa et al. |
| 5,742,118 | A | 4/1998 | Endo et al. |
| 5,747,152 | A | 5/1998 | Oka et al. |
| 5,763,551 | A | 6/1998 | Wunsch et al. |
| 5,773,521 | A | 6/1998 | Hoxmeier et al. |
| 5,777,037 | A | 7/1998 | Yamanaka et al. |
| 5,811,501 | A | 9/1998 | Chiba et al. |
| 5,834,563 | A | 11/1998 | Kimura et al. |
| 5,847,054 | A | 12/1998 | McKee et al. |
| 5,849,847 | A | 12/1998 | Quirk |
| 5,855,972 | A | 1/1999 | Kaeding |
| 5,883,173 | A | 3/1999 | Elspass et al. |
| 5,891,947 | A | 4/1999 | Hall et al. |
| 5,897,811 | A | 4/1999 | Lesko |
| 5,905,116 | A | 5/1999 | Wang et al. |
| 5,910,530 | A | 6/1999 | Wang et al. |
| 5,955,537 | A | 9/1999 | Steininger et al. |
| 5,986,010 | A | 11/1999 | Clites et al. |
| 5,994,468 | A | 11/1999 | Wang et al. |
| 6,011,116 | A | 1/2000 | Aoyama et al. |
| 6,020,446 | A | 2/2000 | Okamoto et al. |
| 6,025,416 | A | 2/2000 | Proebster et al. |
| 6,025,445 | A | 2/2000 | Chiba et al. |
| 6,060,549 | A | 5/2000 | Li et al. |
| 6,060,559 | A | 5/2000 | Feng et al. |
| 6,075,092 | A | 6/2000 | Nakamura et al. |
| 6,087,016 | A | 7/2000 | Feeney et al. |
| 6,087,456 | A | 7/2000 | Sakaguchi et al. |
| 6,106,953 | A | 8/2000 | Zimmermann et al. |
| 6,117,932 | A | 9/2000 | Hasegawa et al. |
| 6,121,379 | A | 9/2000 | Yamanaka et al. |
| 6,127,488 | A | 10/2000 | Obrecht et al. |
| 6,147,151 | A | 11/2000 | Fukumoto et al. |
| 6,166,855 | A | 12/2000 | Ikeyama et al. |
| 6,180,693 | B1 | 1/2001 | Tang et al. |
| 6,191,217 | B1 | 2/2001 | Wang et al. |
| 6,197,849 | B1 | 3/2001 | Zilg et al. |
| 6,204,354 | B1 | 3/2001 | Wang et al. |
| 6,207,263 | B1 | 3/2001 | Takematsu et al. |
| 6,225,394 | B1 | 5/2001 | Lan et al. |
| 6,252,014 | B1 | 6/2001 | Knauss |
| 6,255,372 | B1 | 7/2001 | Lin et al. |
| 6,268,451 | B1 | 7/2001 | Faust et al. |
| 6,277,304 | B1 | 8/2001 | Wei et al. |
| 6,348,546 | B2 | 2/2002 | Hiiro et al. |
| 6,359,075 | B1 | 3/2002 | Wollum et al. |
| 6,379,791 | B1 | 4/2002 | Cernohous et al. |
| 6,383,500 | B1 | 5/2002 | Wooley et al. |
| 6,395,829 | B1 | 5/2002 | Miyamoto et al. |
| 6,420,486 | B1 | 7/2002 | DePorter et al. |
| 6,437,050 | B1 | 8/2002 | Krom et al. |
| 6,441,090 | B1 | 8/2002 | Demirors et al. |
| 6,448,353 | B1 | 9/2002 | Nelson et al. |
| 6,489,378 | B1 | 12/2002 | Sosa et al. |
| 6,506,567 | B2 | 1/2003 | Makino et al. |
| 6,524,595 | B1 | 2/2003 | Perrier et al. |
| 6,573,313 | B2 | 6/2003 | Li et al. |
| 6,573,330 | B1 | 6/2003 | Fujikake et al. |
| 6,598,645 | B1 | 7/2003 | Larson |
| 6,649,702 | B1 | 11/2003 | Rapoport et al. |
| 6,663,960 | B1 | 12/2003 | Murakami et al. |
| 6,689,469 | B2 | 2/2004 | Wang et al. |
| 6,693,746 | B1 | 2/2004 | Nakamura et al. |
| 6,706,813 | B2 | 3/2004 | Chiba et al. |
| 6,706,823 | B2 | 3/2004 | Wang et al. |
| 6,727,307 | B2 | 4/2004 | Kondo et al. |
| 6,727,311 | B2 | 4/2004 | Ajbani et al. |
| 6,737,486 | B2 | 5/2004 | Wang |
| 6,750,297 | B2 | 6/2004 | Yeu et al. |
| 6,759,464 | B2 | 7/2004 | Ajbani et al. |
| 6,774,185 | B2 | 8/2004 | Lin et al. |
| 6,777,500 | B2 | 8/2004 | Lean et al. |
| 6,780,937 | B2 | 8/2004 | Castner |
| 6,835,781 | B2 | 12/2004 | Kondou et al. |
| 6,858,665 | B2 | 2/2005 | Larson |
| 6,861,462 | B2 | 3/2005 | Parker et al. |
| 6,872,785 | B2 | 3/2005 | Wang et al. |
| 6,875,818 | B2 | 4/2005 | Wang |
| 6,908,958 | B2 | 6/2005 | Maruyama et al. |
| 6,956,084 | B2 | 10/2005 | Wang et al. |
| 7,056,840 | B2 | 6/2006 | Miller et al. |
| 7,067,199 | B2 | 6/2006 | Hattori et al. |
| 7,071,246 | B2 | 7/2006 | Xie et al. |
| 7,112,369 | B2 | 9/2006 | Wang et al. |
| 7,179,864 | B2 | 2/2007 | Wang |
| 7,193,004 | B2 | 3/2007 | Weydert et al. |
| 7,205,370 | B2 | 4/2007 | Wang et al. |
| 7,217,775 | B2 | 5/2007 | Castner |

(56) References Cited

U.S. PATENT DOCUMENTS

| | | |
|---|---|---|
| 7,238,751 B2 | 7/2007 | Wang et al. |
| 7,244,783 B2 | 7/2007 | Lean et al. |
| 7,291,394 B2 | 11/2007 | Winkler et al. |
| 7,347,237 B2 | 3/2008 | Xie et al. |
| 7,408,005 B2 | 8/2008 | Zheng et al. |
| 7,538,159 B2 | 5/2009 | Wang et al. |
| 7,544,740 B2 | 6/2009 | Wang et al. |
| 7,553,909 B2 | 6/2009 | Wang et al. |
| 7,560,510 B2 | 7/2009 | Bohm et al. |
| 7,597,959 B2 | 10/2009 | Wang et al. |
| 7,649,049 B2 | 1/2010 | Kleckner et al. |
| 7,659,342 B2 | 2/2010 | Wang et al. |
| 7,695,813 B2 | 4/2010 | Schultes et al. |
| 7,718,737 B2 | 5/2010 | Wang et al. |
| 7,718,738 B2 | 5/2010 | Bohm et al. |
| 7,786,236 B2 | 8/2010 | Wang et al. |
| 7,795,344 B2 | 9/2010 | Wang et al. |
| 7,820,771 B2 | 10/2010 | Lapra et al. |
| 7,829,624 B2 | 11/2010 | Warren |
| 7,884,160 B2 | 2/2011 | Wang et al. |
| 7,897,690 B2 | 3/2011 | Wang et al. |
| 8,063,142 B2 | 11/2011 | Wang et al. |
| 2001/0053813 A1 | 12/2001 | Konno et al. |
| 2002/0007011 A1 | 1/2002 | Konno et al. |
| 2002/0045714 A1 | 4/2002 | Tomalia et al. |
| 2002/0095008 A1 | 7/2002 | Heirnrich et al. |
| 2002/0144401 A1 | 10/2002 | Nogueroles Vines et al. |
| 2003/0004250 A1 | 1/2003 | Ajbani et al. |
| 2003/0124353 A1 | 7/2003 | Wang et al. |
| 2003/0130401 A1 | 7/2003 | Lin et al. |
| 2003/0149185 A1 | 8/2003 | Wang et al. |
| 2003/0198810 A1 | 10/2003 | Wang et al. |
| 2003/0225190 A1 | 12/2003 | Borbely et al. |
| 2004/0033345 A1 | 2/2004 | Dubertret et al. |
| 2004/0059057 A1 | 3/2004 | Swisher et al. |
| 2004/0091546 A1 | 5/2004 | Johnson et al. |
| 2004/0127603 A1 | 7/2004 | Lean et al. |
| 2004/0143064 A1 | 7/2004 | Wang |
| 2004/0198917 A1 | 10/2004 | Castner |
| 2004/0202881 A1 | 10/2004 | Everaerts et al. |
| 2005/0006014 A1 | 1/2005 | Halasa et al. |
| 2005/0101743 A1 | 5/2005 | Stacy et al. |
| 2005/0122819 A1 | 6/2005 | Park et al. |
| 2005/0182158 A1 | 8/2005 | Ziser et al. |
| 2005/0192408 A1 | 9/2005 | Lin et al. |
| 2005/0197462 A1 | 9/2005 | Wang et al. |
| 2005/0203248 A1 | 9/2005 | Zheng et al. |
| 2005/0215693 A1 | 9/2005 | Wang et al. |
| 2005/0220750 A1* | 10/2005 | Robert et al. ............... 424/78.1 |
| 2005/0220890 A1* | 10/2005 | Charmot et al. ............ 424/490 |
| 2005/0228074 A1 | 10/2005 | Wang et al. |
| 2005/0282956 A1 | 12/2005 | Bohm et al. |
| 2005/0288393 A1 | 12/2005 | Lean et al. |
| 2006/0084722 A1 | 4/2006 | Lin et al. |
| 2006/0116473 A1 | 6/2006 | Castner et al. |
| 2006/0147714 A1 | 7/2006 | Schultes et al. |
| 2006/0173115 A1 | 8/2006 | Wang et al. |
| 2006/0173130 A1 | 8/2006 | Wang et al. |
| 2006/0235128 A1 | 10/2006 | Bohm et al. |
| 2006/0280798 A1 | 12/2006 | Ensoli |
| 2007/0081830 A1 | 4/2007 | Bender et al. |
| 2007/0135579 A1 | 6/2007 | Obrecht et al. |
| 2007/0142550 A1 | 6/2007 | Wang et al. |
| 2007/0142559 A1 | 6/2007 | Wang et al. |
| 2007/0149649 A1 | 6/2007 | Wang et al. |
| 2007/0149652 A1* | 6/2007 | Yoon et al. .................. 523/333 |
| 2007/0161754 A1 | 7/2007 | Bohm et al. |
| 2007/0181302 A1* | 8/2007 | Bicerano .................... 166/280.2 |
| 2007/0185273 A1 | 8/2007 | Hall et al. |
| 2007/0196653 A1 | 8/2007 | Hall et al. |
| 2008/0001116 A1 | 1/2008 | Fredrickson et al. |
| 2008/0145660 A1 | 6/2008 | Wang et al. |
| 2008/0149238 A1 | 6/2008 | Kleckner et al. |
| 2008/0160305 A1 | 7/2008 | Wang et al. |
| 2008/0171272 A1 | 7/2008 | Nakashima et al. |
| 2008/0188579 A1 | 8/2008 | Wang et al. |
| 2008/0242813 A1 | 10/2008 | Zheng et al. |
| 2008/0286374 A1 | 11/2008 | Wang et al. |
| 2008/0305336 A1 | 12/2008 | Wang et al. |
| 2009/0005491 A1 | 1/2009 | Warren et al. |
| 2009/0048390 A1 | 2/2009 | Wang et al. |
| 2009/0054554 A1 | 2/2009 | Wang et al. |
| 2009/0270558 A1 | 10/2009 | Gandon-pain et al. |
| 2009/0306246 A1 | 12/2009 | Gervat et al. |
| 2010/0004398 A1 | 1/2010 | Wang et al. |
| 2010/0016472 A1 | 1/2010 | Wang et al. |
| 2010/0016512 A1 | 1/2010 | Wang et al. |
| 2010/0324167 A1 | 12/2010 | Warren et al. |
| 2011/0021702 A1 | 1/2011 | Gandon-Pain et al. |
| 2011/0024011 A1 | 2/2011 | Castner et al. |
| 2011/0172364 A1 | 7/2011 | Yaohong et al. |
| 2011/0213066 A1 | 9/2011 | Wang et al. |
| 2011/0236686 A1 | 9/2011 | Kitano et al. |
| 2012/0132346 A1* | 5/2012 | Chen et al. .................. 156/110.1 |

FOREIGN PATENT DOCUMENTS

| | | |
|---|---|---|
| DE | 3434983 A1 | 4/1986 |
| DE | 3735403 A1 | 5/1989 |
| DE | 4241538 A1 | 6/1994 |
| EP | 0143500 A2 | 6/1985 |
| EP | 0265142 A2 | 4/1988 |
| EP | 0322905 A2 | 7/1989 |
| EP | 0352042 A1 | 1/1990 |
| EP | 0472344 A2 | 2/1992 |
| EP | 0590491 A2 | 4/1994 |
| EP | 0742268 A2 | 11/1996 |
| EP | 1099728 A1 | 5/2001 |
| EP | 1134251 A1 | 9/2001 |
| EP | 1783168 A2 | 5/2007 |
| JP | 70002106 B | 1/1970 |
| JP | 01279943 A | 11/1989 |
| JP | 2191619 A | 7/1990 |
| JP | 2196893 A | 8/1990 |
| JP | 05132605 A | 5/1993 |
| JP | 06-093057 A | 4/1994 |
| JP | 06248017 A | 9/1994 |
| JP | 7011043 A | 1/1995 |
| JP | 08199062 A | 8/1996 |
| JP | 2000514791 A | 11/2000 |
| JP | 2003095640 A | 4/2003 |
| JP | 2005-537341 A | 12/2005 |
| JP | 2006072283 A | 3/2006 |
| JP | 2006106596 A | 4/2006 |
| JP | 2007304409 A | 11/2007 |
| JP | 2008069346 | 3/2008 |
| KR | 1020080057319 | 6/2008 |
| RU | 2184125 C1 | 6/2002 |
| SU | 465010 A3 | 3/1975 |
| WO | 9104992 A1 | 4/1991 |
| WO | 9704029 A1 | 2/1997 |
| WO | 0187999 A2 | 11/2001 |
| WO | 0202472 A1 | 1/2002 |
| WO | 0231002 A1 | 4/2002 |
| WO | 0241987 A2 | 5/2002 |
| WO | 0244290 A2 | 6/2002 |
| WO | 02081233 A1 | 10/2002 |
| WO | 02100936 A1 | 12/2002 |
| WO | 03032061 A1 | 4/2003 |
| WO | 2004058874 A1 | 7/2004 |
| WO | 2006069793 A1 | 7/2006 |
| WO | 2008014464 | 1/2008 |
| WO | 2008079276 A1 | 7/2008 |
| WO | 2008079807 A1 | 7/2008 |
| WO | 2009006434 A1 | 1/2009 |

OTHER PUBLICATIONS

Alexandridis, Paschalis et al., "Amphiphilic Block Copolymers: Self-Assembly and Applications", Elsevier Science B.V., pp. 1-435 (2000).

Allgaier, Jurgen et al., "Synthesis and Micellar Properties of PS-PI Block Copolymers of Different Architecture", ACS Polym. Prepr. (Div Polym. Chem.), vol. 37, No. 2, pp. 670-671 (1996).

(56) References Cited

OTHER PUBLICATIONS

Antonietti, Markus et al., "Determination of the Micelle Architecture of Polystyrene/Poly(4-vinylpyridine) Block Copolymers in Dilute Solution", Macromolecules, 27, pp. 3276-3281 (1994).

Antonietti, Markus et al., "Novel Amphiphilic Block Copolymers by Polymer Reactions and Their Use for Solubilization of Metal Salts and Metal Colloids", Macromolecules, 29, pp. 3800-3806 (1996).

Bahadur, Pratap, "Block copolymers—Their microdomain formation (in solid state) and surfactant behaviour (in solution)", Current Science, vol. 80, No. 8, pp. 1002-1007 (Apr. 25, 2001).

Batzilla, Thomas et al., "Formation of intra- and intermolecular crosslinks in the radical crosslinking of poly(4-vinylstyrene)", Makromol. Chem., Rapid Commun. 8, pp. 261-268 (1987).

Bauer, B.J. et al., "Synthesis and Dilute-Solution Behavior of Model Star-Branched Polymers", Rubber Chemistry and Technology, vol. 51, pp. 406-436 (1978).

Berger, G. et al., "Mutual Termination of Anionic and Cationic 'Living' Polymers", Polymer Letters, vol. 4, pp. 183-186 (1966).

Berger, Sebastian et al., "Stimuli-Responsive Bicomponent Polymer Janus Particles by 'Grafting from'/ 'Grafting to' Approaches," Macromolecules, 41, pp. 9669-9676 (2008).

Bohm, Georg et al., "Emerging materials: technology for new tires and other rubber products", Tire Technology International, 2006 (4 pp.).

Borukhov, Itamar et al., "Enthalpic Stabilization of Brush-Coated Particles in a Polymer Melt", Macromolecules, vol. 35, pp. 5171-5182 (2002).

Bradley, John S., "The Chemistry of Transition Metal Colloids", Clusters and Colloids: From Theory to Applications, Chapter 6, Weinheim, VCH, pp. 459-544 (1994).

Braun, Hartmut et al., "Enthalpic interaction of diblock copolymers with immiscible polymer blend components", Polymer Bulletin, vol. 32, pp. 241-248 (1994).

Bronstein, Lyudmila M. et al., "Synthesis of Pd-, Pt-, and Rh-containing polymers derived from polystyrene-polybutadiene block copolymers; micellization of diblock copolymers due to complexation", Macromol. Chem. Phys., 199, pp. 1357-1363 (1998).

Brown, H.R. et al., "Communications to the Editor: Enthalpy-Driven Swelling of a Polymer Brush", Macromolecules, vol. 23, pp. 3383-3385 (1990).

Cahn, John W., "Phase Separation by Spinodal Decomposition in Isotropic Systems", The Journal of Chemical Physics, vol. 42, No. 1, pp. 93-99 (Jan. 1, 1965).

Calderara, Frederic et al., "Synthesis of chromophore-labelled polystyrene/poly(ethylene oxide) diblock copolymers", Makromol. Chem., 194, pp. 1411-1420 (1993).

Canham et al., "Formation of Worm-like Micelles from a Polystyrene-Polybutadiene-Polystyrene Block Copolymer in Ethyl Acetate", J.C.S. Faraday I, 76, 1857-1867 (1980).

Chen, Ming-Qing et al., "Graft Copolymers Having Hydrophobic Backbone and Hydrophilic Branches. XXIII. Particle Size Control of Poly(ethylene glycol)-Coated Polystyrene Nanopartides Prepared by Macromonomer Method", Journal of Polymer Science: Part A: Polymer Chemistry, vol. 37, pp. 2155-2166 (1999).

Chen, Ming-Qing et al., "Nanosphere Formation in Copolymerization of Methyl Methacrylate with Poly(ethylene glycol) Macromonomers", Journal of Polymer Science: Part A: Polymer Chemistry, vol. 38, pp. 1811-1817 (2000).

Chen, Wei et al., "Ultrahydrophobic and Ultrayophobic Surfaces: Some Comments and Examples", The ACS Journal of Surfaces and Colloids, vol. 15, No. 10, pp. 3395-3399 (May 11, 1999).

Cheng, Lin et al., "Efficient Synthesis of Unimolecular Polymeric Janus Nanoparticles and Their Unique Self-Assembly Behavior in a Common Solvent," Macromolecules, 41, pp. 8159-8166 (2008).

Coleman, Jr. Lester E. et al., "Reaction of Primary Aliphatic Amines with Maleic Anhydride", J. Org,. Chem., 24, 185, pp. 135-136 (1959).

Cosgrove, Terence et al., "Adsorbed Block Copolymer of Poly(2-vinylpyridine) and Polystyrene Studied by Neutron Reflectivity and Surface Force Techniques", Macromolecules, 26, pp. 4363-4367 (1993).

Coulson, S.R. et al., "Super-Repellent Composite Fluoropolymer Surfaces", The Journal of Physical Chemistry B, vol. 104, No. 37, pp. 8836-8840 (Sep. 21, 2000).

Cui, Honggang et al., "Block Copolymer Assembly via Kinetic Control", Science, vol. 317, pp. 647-650 (Aug. 3, 2007).

Dendukuri, Dhananjay et al., "Synthesis and Self-Assembly of Amphiphilic Polymeric Microparticles," Langmuir, 23, pp. 4669-4674 (2007).

Dieterich, W. et al., "Non-Debye Relaxations in Disordered Ionic Solids", Chem. Chys., 284, pp. 439-467 (2002).

The Dow Chemical Company, "DVB Cross-link a variety of materials for improved thermal, physical, and chemical properties," 44 pp. (Jan. 2003).

Edmonds, William F. et al., "Disk Micelles from Nonionic Coil—Coil Diblock Copolymers", Macromolecules, vol. 39, pp. 4526-4530 (May 28, 2006).

Ege, Seyhan, Organic Chemistry Structure and Reactivity, 3rd Edition, p. 959 (1994).

Eisenberg, Adi, "Thermodynamics, Kinetics, and Mechanisms of the Formation of Multiple Block Copolymer Morphologies", Polymer Preprints, vol. 41, No. 2, pp. 1515-1516 (2000).

Erbil, H. Yildirim et al., "Transformation of a Simple Plastic into a Superhydrophobic Surface", Science, vol. 299, pp. 1377-1380 (Feb. 28, 2003).

Erhardt, Rainer et al., "Janus Micelles", Macromolecules, vol. 34, No. 4, pp. 1069-1075 (2001).

Eschwey, Helmut et al., "Preparation and Some Properties of Star-Shaped Polymers with more than Hundred Side Chains", Die Makromolekulare Chemie 173, pp. 235-239 (1973).

Eschwey, Helmut et al., "Star polymers from styrene and divinylbenzene", Polymer, vol. 16, pp. 180-184 (Mar. 1975).

Fendler, Janos H., "Nanoparticles and Nanostructured Films: Preparation, Characterization and Applications", Wiley-VCH, pp. 1-468 (1998).

Ferreira, Paula G. et al., "Scaling Law for Entropic Effects at Interfaces between Grafted Layers and Polymer Melts", Macromolecules, vol. 31, pp. 3994-4003 (1998).

Garcia, Carlos B. et al., "Self-Assembly Approach toward Magnetic Silica-Type Nanoparticles of Different Shapes from Reverse Block Copolymer Mesophases", J. Am. Chem. Soc., vol. 125, pp. 13310-13311 (2003).

Gay, C., "Wetting of a Polymer Brush by a Chemically Identical Polymer Melt", Macromolecules, vol. 30, pp. 5939-5943 (1997).

Giannelis, E.P. "Polymer Layered Silicate Nanocomposites", Advanced Materials, vol. 8, No. 1, pp. 29-35 (Jan. 1, 1996).

Gilman, Jeffrey W. et al., "Recent Advances in Flame Retardant Polymer Nanocomposites", Fire and Materials 2001, 7th International Conference and Exhibition. Proceedings, Interscience Communications Limited, San Antonio, TX, pp. 273-283 (Jan. 22-24, 2001).

Greenwood, N.N. et al., Chemistry of the Elements, Pergaroen Press, New York, pp. 1126-1127 (1984).

Guo, Andrew et al., "Star Polymers and Nanospheres from Cross-Linkable Diblock Copolymers", Macromolecules, vol. 29, pp. 2487-2493 (Jan. 17, 1996).

Haeussler, L. et al., "Simultaneous TA and MS Analysis of Alternating Styrene-Malei Anhydride and Styrene-Maleimide Copolymers", Thermochim. Acta, 277, 14 (1996).

Halperin, A., "Polymeric Micelles: A Star Model", Macromolecules, vol. 20, pp. 2943-2946 (1987).

Hamley, Ian W., "The Physics of Block Copolymers", Oxford Science Publication: Oxford, Chapters 3 and 4, pp. 131-265, (1998).

Hardacre, Christopher et al., "Structure of molten 1,3-dimethylimidazolium chloride using neutron diffraction", Journal of Chemical Physics, vol. 118, No. 1, pp. 273-278 (2003).

Hasegawa, Ryuichi et al., "Optimum Graft Density for Dispersing Particles in Polymer Melts", Macromolecules, vol. 29, pp. 6656-6662 (1996).

(56) References Cited

OTHER PUBLICATIONS

Hay, J.N. et al., A Review of Nanocomposites, 15 pp. (2000).
Hoffman, B. et al., "Rheology of Nanocomposites Based on Layered Silicates and Polyamide-12", Colloid Polm. Sci.., 278, pp. 629-636 (2000).
Ishizu, Koji et al., "Synthesis of Star Polymer with Nucleus of Microgel", Polymer Journal, vol. 12, No. 6, pp. 399-404 (1980).
Ishizu, Koji et al., "Core-Shell Type Polymer Microspheres Prepared from Block Copolymers", Journal of Polymer Science: Part C: Polymer Letters, vol. 26, pp. 281-286 (1988).
Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).
Ishizu, Koji et al., "Preparation of core-shell type polymer microspheres from anionic block copolymers", Polymer, vol. 34, No. 18, pp. 3929-3933 (1993).
Ishizu, Koji, "Synthesis and Structural Ordering of Core-Shell Polymer Microspheres", Prog. Polym. Sci., vol. 23, pp. 1383-1408 (1998).
Ishizu, Koji, "Star Polymers by Immobilizing Functional Block Copolymers", Star and Hyperbranched Polymers, ISBN 0-8247, pp. 135-178 (1999).
Ishizu, Koji, "Structural Ordering of Core Crosslinked Nanoparticles and Architecture of Polymeric Superstructures", ACS Polym. Prepr. (Div Polym Chem) vol. 40, No. 1, pp. 456-457 (1999).
Jensen, M. et al., "EXAFS Investigations of the Mechanism of Facilitated Ion Transfer into a Room-Temperature Ionic Liquid", J. Am. Chem. Soc., 124, pp. 10664-10665 (2002).
Kim, Woo-Sik et al., "Synthesis and Photocrosslinking of Maleimide-Type Polymers", Macromol. Rapid Commun., 17, 835, pp. 835-841 (1996).
Kralik, M. et al., "Catalysis by metal nanoparticles supported on functional organic polymers", Journal of Molecular Catalysis A: Chemical, vol. 177, pp. 113-138 (2001).
Kraus, Gerard, "Mechanical Losses in Carbon-Black-Filled Rubbers", Journal of Applied Polymer Science: Applied Polymer Symposium, vol. 39, pp. 75-92 (1984).
Krishnamoorti, Ramanan et al., "Rheology of End-Tethered Polymer Layered Silicate Nanocomposites", Macromolecules, 30, pp. 4097-4102 (1997).
Lagaly, Gehard, "Kink-Block and Gauche-Block Structures of Bimolecular Films", Chem. Int. Ed. Engl., vol. 15, No. 10, pp. 575-586 (1976).
Lawson, David F. et al., "Preparation and Characterization of Heterophase Blends of Polycaprolactam and Hydrogenated Polydienes", Central Research Journal of Applied Polymer Science, vol. 39, pp. 2331-2351 (1990).
Lee, Wen-Fu et al., "Polysulfobetaines and Corresponding Cationic Polymers. IV. Synthesis and Aqueous Solution Properties of Cationic Poly (MIQSDMAPM)", J. Appl. Pol. Sci., vol. 59, pp. 599-608 (1996).
Ligoure, Christian, "Adhesion between a Polymer Brush and an Elastomer: A Self-Consistent Mean Field Model", Macromolecules, vol. 29, pp. 5459-5468 (1996).
Liu, Guojun et al., "Diblock Copolymer Nanofibers", Macromolecules, 29, pp. 5508-5510 (1996).
Liu, T. et al., "Formation of Amphiphilic Block Copolymer Micelles in Nonaqueous Solution", Amphiphilic Block Copolymers: Self-Assembly and Applications, Elsevier Science B.V., pp. 115-149 (2000).
Ma, Hongyang et al., "Reverse Atom Transfer Radical Polymerization of Methyl Methacrylate in Room-Temperature Ionic Liquids", Journal of Polymer Science: Part A: Polymer Chemistry, 41, pp. 143-151 (2003).
Ma, Qinggao et al., "Entirely Hydrophilic Shell Cross-Linked Knedel-Like (SCK) Nanopartides", Polymer Preprints, vol. 41, No. 2, pp. 1571-1572 (2000).

Mandema et al., "Association of Block Copolymers in Selective Solvents, 1 Measurements on Hydrogenated Poly (styrene-isoprene) in Decane and in trans-Decalin", Makromol. Chem. 180, pp. 1521-1538 (1979).
Matsen, M.W., "Phase Behavior of Block Copolymer/Homopolymer Blends", Macromolecules, vol. 28, pp. 5765-5773 (1995).
Matsumoto, Akikazu et al., "Synthesis, Thermal Properties and Gas Permeability of Poly (N-n-alkylmaleimide)s", Polymer Journal, vol. 23, No. 3, pp. 201-209 (1991).
Mayer, A.B.R. et al., "Transition metal nanoparticles protected by amphiphilic block copolymers as tailored catalyst systems", Colloid Polym. Sci., 275, pp. 333-340 (1997).
Mendizabal, E. et al., "Functionalized Core-Shell Polymers Prepared by Microemulsion Polymerization", ANTEC 1997 Plastics: Plastics Saving Planet Earth, vol. 2: Materials Conference Proceedings, pp. 1733-1737 (1997).
Mi, Yongli et al., "Glass transition of nano-sized single chain globules", Polymer 43, Elsevier Science Ltd., pp. 6701-6705 (2002).
Milner, S.T. et al., "Theory of the Grafted Polymer Brush", Macromolecules, vol. 21, pp. 2610-2619 (1988).
Milner, S.T. et al., "End-Confined Polymers: Corrections to the Newtonian Limit", Macromolecules, vol. 22, pp. 489-490 (1989).
Moller, Martin et al., "Mineralization of Gold in Block Copolymer Micelles", Macromol. Symp., 117, pp. 207-218 (1997).
Mossmer, Stefan et al., "Solution Behavior of Poly(styrene)-block-poly(2-vinylpyridine) Micelles Containing Gold Nanoparticles", Macromolecules, 33, pp. 4791-4798 (2000).
Nace, Vaughn M., "Nonionic Surfactants: Polyoxyalkylene Block Copolymers", Surfactant Science Series, vol. 60, pp. 1-266 (1996).
Newkome George R. et al., "Dendrimers and Dendrons: Concept, Synthesis, Application", Wiley-VCH Verlag GmbH, pp. 45, 191-310 (2001).
Noolandi, Jaan et al., "Theory of Block Copolymer Micelles in Solution", Macromolecules, vol. 16, pp. 1443-1448 (1983).
O'Reilly, Rachel K. et al., "Functionalization of Micelles and Shell Cross-linked Nanoparticles Using Click Chemistry", Chem. Mater., vol. 17, No. 24, pp. 5976-5988 (Nov. 24, 2005).
O'Reilly, Rachel K. et al., "Cross-linked block copolymer micelles: functional nanostructures of great potential and versatility", Chem. Soc. Rev., vol. 35, pp. 1068-1083 (Oct. 2, 2006).
Okay, Oguz et al., "Anionic Dispersion Polymerization of 1,4-Divinylbenzene", Macromolecules, 23, pp. 2623-2628 (1990).
Okay, Oguz et al., "Steric stabilization of reactive microgels from 1,4-divinylbenzene", Makromol. Chem., Rapid Commun., vol. 11, pp. 583-587 (1990).
Oranli, Levent et al., "Hydrodynamic studies on micellar solutions of styrene-butadiene block copolymers in selective solvents", Can. J. Chem., vol. 63, pp. 2691-2696 (1985).
Piirma, Irja, "Polymeric Surfactants", Surfactant Science Series, vol. 42, pp. 1-289 (1992).
Pispas, S. et al., "Effect of Architecture on the Micellization Properties of Block Copolymers: A2B Miktoarm Stars vs AB Diblocks", Macromolecules, vol. 33, pp. 1741-1746 (Feb. 17, 2000).
Powers, P.O., "Solubility of Polystyrene Fractions in Hydrocarbons", Industrial and Engineering Chemistry, vol. 42, No. 12, pp. 2558-2562 (Dec. 1950).
Price, Colin, "Colloidal Properties of Block Copolymers", Applied Science Publishers Ltd., Chapter 2, pp. 39-80 (1982).
Quirk, Roderic P. et al., "Controlled Anionic Synthesis of Polyisoprene-Poly(2-vinylpyridine) Diblock Copolymers in Hydrocarbon Solution", Macromolecules, 34, pp. 1192-1197 (2001).
Rager, Timo et al., "Micelle formation of poly(acrylic acid)- block-poly(methyl methacrylate) block copolymers in mixtures of water with organic solvents", Macromol. Chem. Phys., 200, No. 7, pp. 1672-1680 (1999).
Rein, David H. et al., "Kinetics of arm-first star polymers formation in a non-polar solvent", Macromol. Chem. Phys., vol. 199, pp. 569-574 (1998).
Rempp, Paul et al., "Grafting and Branching of Polymers", Pure Appl. Chem., vol. 30, pp. 229-238 (1972).
Ren, Jiaxiang et al., "Linear Viscoelasticity of Disordered Polystyrene-Polyisoprene Block Copolymer Based Layered-Silicate Nanocomposites", Macromolecules, 33, pp. 3739-3746 (2000).

(56) References Cited

OTHER PUBLICATIONS

Riess, Gerard et al., "Block Copolymers", Encyclopedia of Polymer Science and Engineering, vol. 2, pp. 324-434 (1985).
Riess, Gerard, "Micellization of block copolymers", Progress in Polymer Science, vol. 28, pp. 1107-1170 (Jan. 16, 2003).
Robertson, C.G. et al., "Effect of structural arrest on Poisson's ratio in nanoreinforced elastomers," Physical Review E, vol. 75, pp. 051403-1 thru 051403-7 (2007).
Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).
Saito, Reiko et al., "Synthesis of microspheres with 'hairy-ball' structures from poly (styrene-b-2-vinyl pyridine) diblock copolymers", Polymer, vol. 33, No. 5, pp. 1073-1077 (1992).
Saito, Reiko et al., "Arm-number effect of core-shell type polymer microsphere: 1. Control of arm-number of microsphere", Polymer, vol. 35, No. 4, pp. 866-871 (1994).
Saito, Reiko et al., "Synthesis of Microspheres with Microphase-Separated Shells", Journal of Polymer Science: Part A: Polymer Chemistry, vol. 38, pp. 2091-2097 (2000).
Sakurai, Ryo et al., "68.2: Color and Flexible Electronic Paper Display using QR-LPD Technology", SID 06 Digest, pp. 1922-1925 (2006).
Schacher, Felix et al., "Multicompartment Core Micelles of Triblock Terpolymers in Organic Media," Macromolecules, 42, pp. 3540-3548 (2009).
Semenov, A.N., "Theory of Diblock-Copolymer Segregation to the Interface and Free Surface of a Homopolymer Layer", Macromolecules, vol. 25, pp. 4967-4977 (1992).
Semenov, A.N., "Phase Equilibria in Block Copolymer-Homopolymer Mixtures", Macromolecules, vol. 26, pp. 2273-2281 (1993).
Serizawa, Takeshi et al., "Transmission Electron Microscopic Study of Cross-Sectional Morphologies of Core-Corona Polymeric Nanospheres", Macromolecules, 33, pp. 1759-1764 (2000).
Shull, Kenneth R., "End-Adsorbed Polymer Brushes in High- and Low-Molecular-Weight Matrices", Macromolecules, vol. 29, pp. 2659-2666 (1996).
Simmons, Blake et al., "Templating Nanostructure though the Self-Assembly of Surfactants", Synthesis, Functionalization and Surface Treatment of Nanoparticles, ASP (Am.Sci.Pub.), pp. 51-52, 174-208 (2003).
Stepanek, Miroslav et al. "Time-Dependent Behavior of Block Polyelectrolyte Micelles in Aqueous Media Studied by Potentiometric Titrations, QELS and Fluoroetry", Langmuir, Vo. 16, No. 6, pp. 2502-2507 (2000).
Thurmond II, K. Bruce et al., "Water-Soluble Knedel-like Structures: The Preparation of Shell-Cross-Linked Small Particles", J. Am. Chem. Soc., vol. 118, pp. 7239-7240 (1996).
Thurmond II, K. Bruce et al., "The Study of Shell Cross-Linked Knedels (SCK), Formation and Application", ACS Polym. Prepr. (Div Polym. Chem.), vol. 38, No. 1, pp. 62-63 (1997).
Thurmond, K. Bruce et al., "Shell cross-linked polymer micelles: stabilized assemblies with great versatility and potential", Colloids and Surfaces B: Biointerfaces, vol. 16, pp. 45-54 (1999).
Tiyapiboonchaiya, Churat et al., "Polymer-in-Ionic-Liquid Electrolytes", Macromol. Chem. Phys., 203, pp. 1906-1911 (2002).
Tomalia, Donald A. et al., "Dendritic Macromolecules: Synthesis of Starburst Dendrimers", Macromolecules vol. 19, No. 9, pp. 2466-2468 (1986).
Tsitsilianis, Constantinos et al., "Synthesis and characterization of hetero-arm star copolymers", Makromol. Chem. 191, pp. 2319-2328 (1990).
Tsitsilianis, Constantinos, "Phase Behavior of Heteroarm Star Copolymers by Differential Scanning Calorimetry," Macromolecules, 26, pp. 2977-2980 (1993).
Tuzar, Zdenek et al., "Anomalous Behaviour of Solutions of Styrene-Butadiene Block Copolymers in Some Solvents", Makromol. Chem. 178, 22743-2746 (1977).
Tuzar, Zdenek et al., "Micelles of Block and Graft Copolymers in Solutions", Surface and Colloid Science, vol. 15, Chapter 1, pp. 1-83 (1993).
Utiyama et al., "Light-Scattering Studies of a Polystyrene-Poly(methyl methacrylate) Two-Blcok Copolymer in Mixed Solvents", Macromolecules, vol. 7, No. 4, (Jul.-Aug. 1974).
Vamvakaki, M. et al., "Synthesis of novel block and statistical methacrylate-based ionomers containing acidic, basic or betaine residues", Polymer, vol. 39, No. 11, pp. 2331-2337 (1998).
van der Maarel, J.R.C. et al., "Salt-Induced Contraction of Polyelectrolyte Diblock Copolymer Micelles", Langmuir, vol. 16, No. 19, pp. 7510-7519 (2000).
Vermeesch, I. et al., "Chemical Modification of Poly (styrene-co-maleic anhydride) with Primary N-Alkylamines by Reactive Extrusion", J. Applied Polym. Sci., vol. 53, pp. 1365-1373 (1994).
Walther, Andreas et al., "Engineering Nanostructured Polymer Blends with Controlled Nanoparticle Location using Janus Particles," ACS Nano., 2(6), pp. 1167-1178 (2008).
Walther, Andreas et al., "Janus Particles," Soft Matter, 4, pp. 663-668 (2008).
Wang, Xiaorong et al., "Chain conformation in two-dimensional dense state", Journal of Chemical Physics, vol. 121, No. 16, pp. 8158-8162 (Oct. 22, 2004).
Wang, Xiaorong et al., "Strain-induced nonlinearity of filled rubbers", Physical Review E 72, 031406, pp. 1-9 (Sep. 20, 2005).
Pre-print article, Wang, Xiaorong et al., "PMSE 392—Manufacture and Commercial Uses of Polymeric Nanoparticles", Division of Polymeric Materials: Science and Engineering (Mar. 2006).
Wang, Xiaorong et al., "Manufacture and Commercial Uses of Polymeric Nanoparticles", Polymeric Materials: Science and Engineering, vol. 94, p. 659 (2006).
Wang, Xiaorong et al., "Under microscopes the poly(styrene/butadiene) nanopartides", Journal of Electron Microscopy, vol. 56, No. 6, pp. 209-216 (2007).
Wang, Xiaorong et al., "Synthesis, Characterization, and Application of Novel Polymeric Nanoparticles", Macromolecules, 40, pp. 499-508 (2007).
Wang, Xiaorong et al., "Heterogeneity of structural relaxation in a particle-suspension system", EPL, 79, 18001, pp. 1-5 (Jul. 2007).
Wang, Xiaorong et al., "Dispersing hairy nanoparticles in polymer melts", Polmer, vol. 49, pp. 5683-5691 (Nov. 1, 2008).
Wang, Xr. et al., "Fluctuations and critical phenomena of a filled elastomer under deformation", Europhysics Letters, vol. 75, No. 4, pp. 590-596 (Aug. 15, 2006).
Wang, Y. et al., "Janus-Like Polymer Particles Prepared Via Internal Phase Separation from Emulsified Polymer/Oil Droplets," Polymer, vol. 50, No. 14, pp. 3361-3369 (2009).
Webber, Stephen E. et al., "Solvents and Self-Organization of Polymers", NATO ASI Series, Series E: Applied Sciences, vol. 327, pp. 1-509 (1996).
Whitmore, Mark Douglas et al., "Theory of Micelle Formation in Block Copolymer-Homopolymer Blends", Macromolecules, vol. 18, pp. 657-665 (1985).
Wijmans, C.M. et al., "Effect of Free Polymer on the Structure of a Polymer Brush and Interaction between Two Polymer Brushes", Macromolecules, vol. 27, pp. 3238-3248 (1994).
Wiley, John, "Quaternary Ammonium Compounds", Encyclopedia of Chem Tech., 4th Ed. vol. 20, pp. 739-767 (1996).
Wilkes, John S. et al., "Dialkylimidazolium Chloroaluminate Melts: A New Class of Room-Temperature Ionic Liquids for Electrochemistry, Spectroscopy, and Synthesis", Inorg. Chem., 21, pp. 1263-1264 (1982).
Wilson, D.J. et al., "Photochemical Stabilization of Block Copolymer Micelles", Eur. Polym. J., vol. 24, No. 7, pp. 617-621 (1988).
Witten, T.A. et al., "Stress Relaxation in the Lamellar Copolymer Mesophase", Macromolecules, vol. 23, pp. 824-829 (1990).
Wooley, Karen L, "From Dendrimers to Knedel-like Structures", Chem. Eur. J., 3, No. 9, pp. 1397-1399 (1997).
Wooley, Karen L, "Shell Crosslinked Polymer Assemblies: Nanoscale Constructs Inspired from Biological Systems", Journal of Polymer Science: Part A: Polymer Chemistry, vol. 38, pp. 1397-1407 (2000).

(56) References Cited

OTHER PUBLICATIONS

Worsfold, Denis J. et al., "Preparation et caracterisation de polymeres-modele a structure en etoile, par copolymerisation sequencee anionique", Canadian Journal of Chemistry, vol. 47, pp. 3379-3385 (Mar. 20, 1969).
Worsfold, D.J., "Anionic Copolymerization of Styrene with p-Divinylbenzene", Macromolecules, vol. 3, No. 5, pp. 514-517 (Sep.-Oct. 1970).
Zhang, Jian et al., "Bioconjugated Janus Particles Prepared by in Situ Click Chemistry," Chemistry of Materials, 21, pp. 4012-4018 (2009).
Zhao, Bin et al., "Mixed Polymer Brush-Grafted Particles: A New Class of Environmentally Responsive Nanostructured Materials," Macromolecules, 42, pp. 9369-9383 (2009).
Zheng, Lei et al., "Polystyrene Nanoparticles with Anionically Polymerized Polybutadiene Brushes", Macromolecules, 37, pp. 9954-9962 (2004).
Zilliox, Jean-Georges et al., "Preparation de Macromolecules a Structure en Etoile, par Copolymerisation Anionique", J. Polymer Sci.: Part C, No. 22, pp. 145-156 (1968).
Bridgestone Americas 2006 Presentation (14 pp.).
Vulcanization Agents and Auxiliary Materials, Rubber Compounding, Kirk-Othmer, Encyclopedia of Chemical Technology, 3rd Ed., Wiley Interscience, NY, vol. 20. pp. 390-402 (1982).
Wang, Xiaorong et al., U.S. Appl. No. 12/184,895, filed Aug. 1, 2008 entitled "Disk-Like Nanoparticles".
Lipman, Bernard, Mar. 26, 2002 Notice of Allowance from U.S. Appl. No. 09/970,830 (4 pp.).
Kiliman, Leszek B., Feb. 13, 2003 Office Action from U.S. Appl. No. 10/038,748 (3 pp.).
Kiliman, Leszak B., Aug. 25, 2003 Notice of Allowance from U.S. Appl. No. 10/038,748 (5 pp.).
Schutte, M., Nov. 13, 2003 International Search Report from PCT Application No. PCT/US02/31817 (3 pp.).
Harlan, Robert D., Mar. 17, 2004 Restriction/Election Office Action from U.S. Appl. No. 10/223,393 (6 pp.).
Lipman, Bernard, Mar. 24, 2004 Restriction/Election Office Action from U.S. Appl. No. 10/345,498 (5 pp.).
Lipman, Bernard, Mar. 25, 2004 Restriction/Election Office Action from U.S. Appl. No. 10/331,841 (6 pp.).
Schutte, M., May 28, 2004 International Search Report from PCT Application No. PCT/US03/40375 (3 pp.).
Harlan, Robert D., Jun. 22, 2004 Office Action from U.S. Appl. No. 10/223,393 (6 pp.).
Iraegui Retolaza, E., Jul. 9, 2004 International Search Report from PCT Application No. PCT/US2004/001000 (3 pp.).
Lipman, Bernard, Nov. 18, 2004 Notice of Allowance from U.S. Appl. No. 10/331,841 (5 pp.).
Lipman, Bernard, Nov. 23, 2004 Notice of Allowance from U.S. Appl. No. 10/345,498 (5 pp.).
Le, Hoa T., Dec. 14, 2004 Office Action from U.S. Appl. No. 10/791,491 (5 pp.).
Harlan, Robert D., Jan. 3, 2005 Notice of Allowance from U.S. Appl. No. 10/223,393 (6 pp.).
Le, Hoa T., Jul. 5, 2005 Office Action from U.S. Appl. No. 10/791,491 (9 pp.).
Russell, G., Aug. 1, 2005 International Search Report from PCT Application No. PCT/US2005/010352 (3 pp.).
Kiliman, Leszek B., Sep. 9, 2005 Office Action from U.S. Appl. No. 10/817,995 (7 pp.).
Raza, Saira B., Oct. 20, 2005 Office Action from U.S. Appl. No. 11/104,759 (10 pp.).
Harlan, Robert D., Nov. 7, 2005 Office Action from U.S. Appl. No. 11/117,981 (7 pp.).
Chen, Jizhuang, Dec. 30, 2005 Office Action from Chinese Application No. 02819527.2 (9 pp.).
Kiliman, Leszek B., Mar. 23, 2006 Office Action from U.S. Appl. No. 10/817,995 (7 pp.).
Choi, Ling Siu, Mar. 24, 2006 Office Action from U.S. Appl. No. 10/755,648 (11 pp.).
Le, Hoa T., Apr. 10, 2006 Notice of Allowance from U.S. Appl. No. 10/791,491 (5 pp.).
Asinovsky, Olga, Jun. 20, 2006 Office Action from U.S. Appl. No. 10/791,049 (11 pp.).
Harlan, Robert D., Jul. 20, 2006 Office Action from U.S. Appl. No. 11/117,981 (6 pp.).
Schutte, M., Aug. 8, 2006 Office Action from European Application No. 02807196.7 (5 pp.).
Raza, Saira B., Aug. 21, 2006 Office Action from U.S. Appl. No. 11/104,759 (6 pp.).
Chevalier, Alicia Ann, Sep. 6, 2006 Office Action from U.S. Appl. No. 10/886,283 (5 pp.).
Lipman, Bernard, Sep. 14, 2006 Office Action from U.S. Appl. No. 11/168,297 (4 pp.).
Lipman, Bernard., Sep. 29, 2006 Office Action from U.S. Appl. No. 11/058,156 (5 pp.).
Lipman, Bernard, Oct. 3, 2006 Notice of Allowance from U.S. Appl. No. 11/064,234 (5 pp.).
Mullis, Jeffrey C., Oct. 31, 2006 Office Action from U.S. Appl. No. 11/050,115 (6 pp.).
Choi, Ling Siu, Dec. 4, 2006 Notice of Allowance from U.S. Appl. No. 10/755,648 (9 pp.).
Kiliman, Leszek B., Dec. 13, 2006 Office Action from U.S. Appl. No. 10/817,995 (6 pp.).
Wyrozebski Lee, Katarzyna I., Dec. 19, 2006 Office Action from U.S. Appl. No. 10/872,731 (6 pp.).
Asinovsky, Olga, Dec. 22, 2006 Office Action from U.S. Appl. No. 10/791,049 (11 pp.).
Haider, Saira Bano, Dec. 22, 2006 Advisory Action from U.S. Appl. No. 11/104,759 (3 pp.).
Chevalier, Alicia Ann, Jan. 4, 2007 Office Action from U.S. Appl. No. 10/886,283 (8 pp.).
Ronesi, Vickey M., Jan. 8, 2007 Office Action from U.S. Appl. No. 10/791,177 (5 pp.).
Harlan, Robert D., Jan. 26, 2007 Office Action from U.S. Appl. No. 11/117,981 (8 pp.).
Lipman, Bernard, Mar. 2, 2007 Notice of Allowance from U.S. Appl. No. 11/168,297 (3 pp.).
Wyrozebski Lee, Katarzyna I., Mar. 7, 2007 Office Action from U.S. Appl. No. 10/872,731 (13 pp.).
Lipman, Bernard, Apr. 18, 2007 Supplemental Notice of Allowability from U.S. Appl. No. 11/168,297 (3 pp.).
Mullis, Jeffrey C., Nov. 5, 2008 Advisory Action from U.S. Appl. No. 11/050,115 (4 pp.).
Haider, Saira Bano, Dec. 2, 2008 Office Action from U.S. Appl. No. 11/104,759 (10 pp.).
Cain, Edward J., Dec. 9, 2008 Final Office Action from U.S. Appl. No. 11/642,795 (6 pp.).
Harlan, Robert D., Dec. 10, 2008 Final Office Action from U.S. Appl. No. 10/791,177 (8 pp.).
Mulcahy, Peter D., Dec. 11, 2008 Restriction/Election Office Action from U.S. Appl. No. 11/642,802 (7 pp.).
Johnson, Edward M., Dec. 12, 2008 International Search Report from PCT Application No. PCT/US07/74611 (5 pp.).
Cain, Edward J., Dec. 31, 2008 Notice of Allowance from U.S. Appl. No. 11/642,124 (5 pp.).
Harlan, Robert D., Jan. 9, 2009 Office Action from U.S. Appl. No. 11/117,981 (6 pp.).
Lipman, Bernard, Jan. 14, 2009 Notice of Allowance from U.S. Appl. No. 11/058,156 (5 pp.).
Zemel, Irina Sopja, Jan. 22, 2009 Advisory Action from U.S. Appl. No. 11/305,279 (2 pp.).
Lipman, Bernard, Jan. 27, 2009 Notice of Allowance from U.S. Appl. No. 11/764,607 (4 pp.).
Lipman, Bernard, Jan. 28, 2009 Notice of Allowance from U.S. Appl. No. 11/305,281 (5 pp.).
Cain, Edward J., Feb. 23, 2009 Notice of Allowance from U.S. Appl. No. 11/642,795 (5 pp.).
Mullis, Jeffrey C., Feb. 25, 2009 Office Action from U.S. Appl. No. 11/050,115 (8 pp.).
Haider, Saira Bano, Mar. 3, 2009 Advisory Action from U.S. Appl. No. 11/104,759 (3 pp.).

(56) References Cited

OTHER PUBLICATIONS

Mullis, Jeffrey C., Mar. 11, 2009 Office Action from U.S. Appl. No. 10/791,049 (9 pp.).
Harlan, Robert D., Mar. 11, 2009 Notice of Allowance from U.S. Appl. No. 10/791,177 (8 pp.).
Kiliman, Leszek B., Mar. 19, 2009 Office Action from U.S. Appl. No. 10/817,995 (5 pp.).
Sykes, Altrev C., Mar. 20, 2009 Office Action from U.S. Appl. No. 11/818,023 (27 pp.).
Cain, Edward J., Mar. 31, 2009 Notice of Allowance from U.S. Appl. No. 11/642,124 (5 pp.).
Pak, Hannah J., Apr. 2, 2009 Office Action from U.S. Appl. No. 11/941,128 (9 pp.).
Harlan, Robert D., Apr. 30, 2009 Office Action from U.S. Appl. No. 11/117,981 (7 pp.).
Mullis, Jeffrey C., Apr. 30, 2009 Final Office Action from U.S. Appl. No. 11/641,514 (11 pp.).
Peets, Monique R., May 11, 2009 Restriction/Election Office Action from U.S. Appl. No. 11/697,801 (6 pp.).
Mulcahy, Peter D., May 13, 2009 Office Action from U.S. Appl. No. 11/642,802 (7 pp.).
Le, Hoa T., May 14, 2009 Notice of Allowance from U.S. Appl. No. 11/612,554 (4 pp.).
Mullis, Jeffrey C., May 19, 2009 Advisory Action from U.S. Appl. No. 10/791,049 (5 pp.).
Zemel, Irina Sopja, May 28, 2009 Office Action from U.S. Appl. No. 11/305,279 (7 pp.).
Cussac, Yolaine, Jun. 24, 2009 International Preliminary Report on Patentability from PCT Application No. PCT/US2007/026031 (7 pp.).
Mullis, Jeffrey C., Jul. 15, 2009 Advisory Action from U.S. Appl. No. 11/641,514 (4 pp.).
Peets, Monique R., Jul. 20, 2009 Office Action from U.S. Appl. No. 11/697,801 (9 pp.).
Haider, Saira Bano, Sep. 11, 2009 Examiners Answer from U.S. Appl. No. 11/104,759 (9 pp.).
Mullis, Jeffrey C., Sep. 21, 2009 Notice of Allowance from U.S. Appl. No. 11/050,115 (4 pp.).
Harlan, Robert D., Sep. 29, 2009 Final Office Action from U.S. Appl. No. 11/117,981 (6 pp.).
Wheeler, Thurman Michael, Oct. 14, 2009 Restriction/Election Office Action from U.S. Appl. No. 11/642,796 (8 pp.).
Sykes, Altrev C., Oct. 16, 2009 Office Action from U.S. Appl. No. 11/818,023 (20 pp.).
Mullis, Jeffrey C., Nov. 9, 2009 Office Action from U.S. Appl. No. 11/641,514 (9 pp.).
Mulcahy, Peter D., Nov. 9, 2009 Final Office Action from U.S. Appl. No. 11/642,802 (6 pp.).
Kiliman, Leszek B., Nov. 13, 2009 Office Action from U.S. Appl. No. 10/817,995 (6 pp.).
Chevalier, Alicia Ann, Nov. 25, 2009 Office Action from U.S. Appl. No. 10/886,283 (7 pp.).
Zemel, Irina Sopja, Dec. 3, 2009 Final Office Action from U.S. Appl. No. 11/305,279 (10 pp.).
Harlan, Robert D., Dec. 4, 2009 Notice of Allowance from U.S. Appl. No. 11/117,981 (5 pp.).
Mullis, Jeffrey C., Dec. 18, 2009 Supplemental Notice of Allowability from U.S. Appl. No. 11/050,115 (2 pp.).
Harlan, Robert D., Dec. 28, 2009 Office Action from U.S. Appl. No. 12/504,255 (6 pp.).
Harlan, Robert D., Dec. 29, 2009 Notice of Allowance from U.S. Appl. No. 10/791,177 (6 pp.).
Peets, Monique R., Jan. 5, 2010 Final Office Action from U.S. Appl. No. 11/697,801 (9 pp.).
Pak, Hannah J., Jan. 6, 2010 Final Office Action from U.S. Appl. No. 11/941,128 (10 pp.).
Wheeler, Thurman Michael, Feb. 8, 2010 Office Action from U.S. Appl. No. 11/642,796 (13 pp.).
Mullis, Jeffrey C., Mar. 3, 2010 Restriction/Election Office Action from U.S. Appl. No. 11/771,659 (7 pp.).
Sykes, Altrev C., Apr. 5, 2010 Final Office Action from U.S. Appl. No. 11/818,023 (24 pp.).
Harlan, Robert D., May 3, 2007 Office Action from U.S. Appl. No. 10/791,177 (6 pp.).
Kiliman, Leszak B., May 15, 2007 Advisory Action from U.S. Appl. No. 10/817,995 (2 pp.).
Haider, Saira Bano, May 16, 2007 Office Action from U.S. Appl. No. 11/104,759 (9 pp.).
Lipman, Bernard, May 21, 2007 Notice of Allowance from U.S. Appl. No. 11/058,156 (3 pp.).
Asinovsky, Olga, Jun. 7, 2007 Office Action from U.S. Appl. No. 10/791,049 (11 pp.).
Chevalier, Alicia Ann, Jul. 2, 2007 Office Action from U.S. Appl. No. 10/886,283 (8 pp.).
Harlan, Robert D., Jul. 12, 2007 Office Action from U.S. Appl. No. 11/117,981 (6 pp.).
Asinovsky, Olga, Aug. 16, 2007 Advisory Action from U.S. Appl. No. 10/791,049 (2 pp.).
Lipman, Bernard, Aug. 28, 2007 Notice of Allowance from U.S. Appl. No. 11/058,156 (5 pp.).
Schutte, Maya, Sep. 3, 2007 Office Action from European Application No. 02807196.7 (2 pp.).
Wyrozebski Lee, Katarzyna I., Sep. 14, 2007 Office Action from U.S. Appl. No. 10/872,731 (9 pp.).
Harlan, Robert D., Oct. 18, 2007 Office Action from U.S. Appl. No. 10/791,177 (6 pp.).
Haider, Saira Bano, Oct. 30, 2007 Office Action from U.S. Appl. No. 11/104,759 (9 pp.).
Asinovsky, Olga, Nov. 28, 2007 Office Action from U.S. Appl. No. 10/791,049 (9 pp.).
Chen, Jizhuang, Dec. 21, 2007 Office Action from Chinese Application No. 02819527.2 (12 pp.).
Harlan, Robert D., Jan. 2, 2008 Office Action from U.S. Appl. No. 11/117,981 (6 pp.).
Chevalier, Alicia Ann, Jan. 4, 2008 Office Action from U.S. Appl. No. 10/886,283 (8 pp.).
Harlan, Robert D., Jan. 9, 2008 Advisory Action from U.S. Appl. No. 10/791,177 (3 pp.).
Maksymonko, John M., Feb. 20, 2008 Office Action from U.S. Appl. No. 11/305,279 (14 pp.).
Lipman, Bernard, Feb. 28, 2008 Notice of Allowance from U.S. Appl. No. 11/058,156 (5 pp.).
Harlan, Robert D., Mar. 7, 2008 Advisory Action from U.S. Appl. No. 10/791,177 (3 pp.).
Haider, Saira Bano, Mar. 19, 2008 Advisory Action from U.S. Appl. No. 11/104,759 (3 pp.).
Lipman, Bernard, Mar. 20, 2008 Office Action from U.S. Appl. No. 11/764,607 (4 pp.).
Mullis, Jeffrey C., Mar. 24, 2008 Office Action from U.S. Appl. No. 11/050,115 (10 pp.).
Kiliman, Leszak B., Apr. 2, 2008 Notice of Allowance from U.S. Appl. No. 10/817,995 (5 pp.).
Watanabe, Y., May 7, 2008 Office Action from Japanese Application No. 582224/2003 (5 pp.).
Asinovsky, Olga, May 21, 2008 Office Action from U.S. Appl. No. 10/791,049 (11 pp.).
Mettler, Rolf-Martin, May 27, 2008 International Search Report from PCT Application No. PCT/US2007/087869 (4 pp.).
Harlan, Robert D., May 28, 2008 Office Action from U.S. Appl. No. 10/791,177 (8 pp.).
Maksymonko, John M., May 28, 2008 Office Action from U.S. Appl. No. 11/642,802 (10 pp.).
Lipman, Bernard, May 29, 2008 Notice of Allowance from U.S. Appl. No. 11/058,156 (5 pp.).
Maksymonko, John M., May 30, 2008 Office Action from U.S. Appl. No. 11/642,795 (12 pp.).
Iraegui Retolaza, E., May 30, 2008 International Search Report from PCT Application No. PCT/US2007/026031 (4 pp.).
Maksymonko, John M., Jun. 11, 2008 Office Action from U.S. Appl. No. 11/642,124 (16 pp.).
Haider, Saira Bano, Jun. 12, 2008 Office Action from U.S. Appl. No. 11/104,759 (10 pp.).

(56) References Cited

OTHER PUBLICATIONS

Maksymonko, John M., Jun. 13, 2008 Office Action from U.S. Appl. No. 11/641,514 (7 pp.).
Maksymonko, John M., Jul. 17, 2008 Office Action from U.S. Appl. No. 11/305,281 (13 pp.).
Harlan, Robert D., Jul. 25, 2008 Office Action from U.S. Appl. No. 11/117,981 (8 pp.).
Asinovsky, Olga, Jul. 29, 2008 Advisory Action from U.S. Appl. No. 10/791,049 (3 pp.).
Watanabe, Y., Jul. 29, 2008 Office Action from Japanese Application No. 582224/2003 (17 pp.).
Maksymonko, John M., Aug. 6, 2008 Office Action from U.S. Appl. No. 11/305,279 (11 pp.).
Mullis, Jeffrey C., Aug. 21, 2008 Office Action from U.S. Appl. No. 11/050,115 (7 pp.).
Hammon, Andrew, Aug. 25, 2008 International Search Report from PCT Application No. PCT/US2008/068838 (4 pp.).
Kiliman, Leszek B., Sep. 5, 2008 Office Action from U.S. Appl. No. 10/817,995 (5 pp.).
Asinovsky, Olga, Sep. 11, 2008 Office Action from U.S. Appl. No. 10/791,049 (12 pp.).
Le, Hoa T., Sep. 25, 2008 Office Action from U.S. Appl. No. 11/612,554 (8 pp.).
Lipman, Bernard, Sep. 25, 2008 Notice of Allowance from U.S. Appl. No. 11/764,607 (3 pp.).
Chen, Jizhuang, Sep. 26, 2008 Office Action from Chinese Application No. 02819527.2 (4 pp.).
Mullis, Jeffrey C., Oct. 31, 2008 Office Action from U.S. Appl. No. 11/641,514 (10 pp.).
Russell, Graham, Nov. 4, 2008 Office Action from European Application No. 05742316.2 (2 pp.).
Peets, Monique R., Apr. 15, 2010 Notice of Allowance from U.S. Appl. No. 11/697,801 (5 pp.).
Pak, Hannah J., Apr. 30, 2010 Notice of Allowance from U.S. Appl. No. 11/941,128 (11 pp.).
Chevalier, Alicia Ann, May 3, 2010 Final Office Action from U.S. Appl. No. 10/886,283 (8 pp.).
Harlan, Robert D., May 13, 2010 Final Office Action from U.S. Appl. No. 12/504,255 (7 pp.).
Mullis, Jeffrey C., May 26, 2010 Final Office Action from U.S. Appl. No. 11/641,514 (8 pp.).
Ducheneaux, Frank D., Jun. 8, 2010 Office Action from U.S. Appl. No. 10/817,995 (19 pp.).
Harlan, Robert D., Jun. 9, 2010 Office Action from U.S. Appl. No. 12/504,255 (6 pp.).
Mullis, Jeffrey C., Jun. 30, 2010 Notice of Allowance from U.S. Appl. No. 11/771,659 (5 pp.).
Chevalier, Alicia Ann, Jul. 8, 2010 Advisory Action from U.S. Appl. No. 10/886,283 (3 pp.).
Wheeler, Thurman Michael, Jul. 30, 2010 Final Office Action from U.S. Appl. No. 11/642,796 (15 pp.).
Mullis, Jeffrey C., Aug. 12, 2010 Advisory Action from U.S. Appl. No. 11/641,514 (4 pp.).
Mensah, Laure, Sep. 20, 2010 Office Action from European Application No. 07813483.0 (4 pp.).
Egwim, Kelechi Chidi, Sep. 30, 2010 Office Action from U.S. Appl. No. 12/047,896 (6 pp.).
Mullis, Jeffrey C., Oct. 8, 2010 Notice of Allowance from U.S. Appl. No. 11/641,514 (2 pp.).
Syes, Altrev C., Oct. 22, 2010 Advisory Action from U.S. Appl. No. 11/818,023 (2 pp.).
Sykes, Altrev C., Oct. 29, 2010 Examiner's Answer from U.S. Appl. No. 11/818,023 (24 pp.).
Chevalier, Alicia Ann, Nov. 23, 2010 Office Action from U.S. Appl. No. 10/886,283 (6 pp.).
Mullis, Jeffrey C., Nov. 24, 2010 Notice of Allowability from U.S. Appl. No. 11/641,514 (3 pp.).
Harlan, Robert D., Dec. 1, 2010 Notice of Allowance from U.S. Appl. No. 12/504,255 (6 pp.).
Ducheneaux, Frank D., Dec. 28, 2010 Final Office Action from U.S. Appl. No. 10/817,995 (24 pp.).
Haider, Saira Bano, Feb. 9, 2011 Decision on Appeal from U.S. Appl. No. 11/104,759 (4 pp.).
Mullis, Jeffrey C., Feb. 9, 2011 Restriction/Election Office Action from U.S. Appl. No. 12/288,174 (8 pp.).
Egwim, Kelechi Chidi, Mar. 21, 2011 Final Office Action from U.S. Appl. No. 12/047,896 (6 pp.).
Mullis, Jeffrey C., Mar. 30, 2011 Decision on Appeal from U.S. Appl. No. 10/791,049 (7 pp.).
Ducheneaux, Frank D., Apr. 4, 2011 Advisory Action from U.S. Appl. No. 10/817,995 (6 pp.).
Rosenberg, Nancy D., Apr. 12, 2011 Notice of Allowance from U.S. Appl. No. 10/886,283 (4 pp.).
Brovkina, T.A., English translation of May 4, 2011 Office Action from Russian Application No. 2009107218 (7 pp.).
Mullis, Jeffrey C., May 23, 2011 Office Action from U.S. Appl. No. 12/288,174 (6 pp.).
Wheeler, Thurman Michael, May 31, 2011 Office Action from U.S. Appl. No. 11/642,796 (12 pp.).
Mullis, Jeffrey C., Jun. 3, 2011 Restriction/Election Office Action from U.S. Appl. No. 12/374,883 (7 pp.).
Egwim, Kelechi Chidi, Jun. 13, 2011 Advisory Action from U.S. Appl. No. 12/047,896 (2 pp.).
Xia, Lanying, Jul. 6, 2011 Office Action with English translation from Chinese Application No. 200780047895.2 (8 pp.).
Mullis, Jeffrey C., Jul. 27, 2011 Office Action from U.S. Appl. No. 12/374,883 (13 pp.).
Brovkina, T.A., Oct. 12, 2011 Office Action with English translation from Russian Application No. 2009107218 (8 pp.).
Nov. 3, 2011 Office Action with English translation from Chinese Application No. 200780036040.X (12 pp.).
Mulcahy, Peter D., Nov. 9, 2011 Office Action from U.S. Appl. No. 11/642,802 (6 pp.).
Fink, Brieann R., Dec. 1, 2011 Office Action from U.S. Appl. No. 12/754,367 (15 pp.).
Mullis, Jeffrey C., Feb. 1, 2012 Office Action from U.S. Appl. No. 12/374,883 (9 pp.).
Zemei, Irina Sopja, Apr. 30, 2012 Decision on Appeal from U.S. Appl. No. 11/305,279 (12 pp.).
Wang, Chun Cheng, May 4, 2012 Office Action from U.S. Appl. No. 12/555,183 (9 pp.).
Watanabe, Yoko, May 22, 2012 Office Action with English translation from Japanese Application No. 2008-248866 (5 pp.).
Malashkova, E.S., Jun. 1, 2012 Office Action with English translation from Russian Application No. 2010102943 (10 pp.).
Fink, Brieann R., Jun. 6, 2012 Final Office Action from U.S. Appl. No. 12/754,367 (13 pp.).
Adams, Donald E. et al., Jun. 18, 2012 Decision on Appeal from U.S. Appl. No. 11/818,023 (13 pp.).
Kaucher, Mark S., Nov. 5, 2012 Office Action from U.S. Appl. No. 12/979,732 (24 pp.).
Wheeler, Thurman Michael, Nov. 6, 2012 Office Action from U.S. Appl. No. 11/642,796 (14 pp.).
Sykes, Altrev C., Nov. 8, 2012 Final Office Action from U.S. Appl. No. 11/818,023 (20 pp.).
Mulcahy, Peter D., Dec. 6, 2012 Final Office Action from U.S. Appl. No. 11/642,802 (7 pp.).
Min, Ke et al., "Atom Transfer Radical Dispersion Polymerization of Styrene in Ethanol," Macromolecules, vol. 40, pp. 7217-7222 (2007).
Papadopoulos, P. et al., "Origin of Glass Transition of Poly(2-vinylpyridine). A Temperature- and Pressure-Dependent Dielectric Spectroscopy Study," Macromolecules, vol. 37, pp. 8116-8122 (2004).
Nakamura, Eiji, Mar. 26, 2013 Office Action with English translation from Japanese Application No. 2009-522021 (9 pp.).
Giesemann, Gerhard, Apr. 8, 2013 Office Action from European Application No. 08772275.7 (4 pp.).
Peets, Monique R., Apr. 11, 2013 Office Action from U.S. Appl. No. 12/979,719 (6 pp.).
Inoue, M., Jun. 4, 2013 Office Action with English translation from Japanese Application No. 2009-543130 (6 pp.).

(56) References Cited

OTHER PUBLICATIONS

Chinese Patent Office, Jun. 28, 2013 Office Action with English translation from Chinese Application No. 200980157756.4 (13 pp.).
Wheeler, Thurman Michael, Jul. 5, 2013 Final Office Action from U.S. Appl. No. 11/642,796 (10 pp.).
Chinese Patent Office, Sep. 4, 2013 Office Action with English translation from Chinese Application No. 200780036040.X (18 pp.).
Sykes, Altrev C., Sep. 5, 2013 Office Action from U.S. Appl. No. 11/818,023 (22 pp.).
Zemel, Irina Sophia, Sep. 30, 2013 Final Office Action from U.S. Appl. No. 11/305,279 (7 pp.).
Fink, Brieann R., Sep. 30, 2013 Office Action from U.S. Appl. No. 12/754,367 (14 pp.).
Uchida, Y., Oct. 1, 2013 Office Action with English translation from Japanese Application No. 2010-515229 (9 pp.).
Korean Patent Office, Nov. 28, 2013 Office Action from Korean Application No. 10-2009-7004191 (7 pp.).
Chinese Patent Office, Dec. 4, 2013 Office Action from Chinese Application No. 200980157756.4 (8 pp.).
Mulcahy, Peter D., Dec. 10, 2013 Notice of Allowance from U.S. Appl. No. 11/642,802 (2 pp.).
Zemel, Irina Sophia, Jan. 3, 2014 Advisory Action from U.S. Appl. No. 11/305,279 (3 pp.).
Nakamura, Eiji, Feb. 12, 2014 Office Action with English translation from Japanese Application No. 2009-522021 (11 pp.).
Sykes, Altrev C., Feb. 14, 2014 Final Office Action from U.S. Appl. No. 11/818,023 (26 pp.).
Fink, Brieann R., Apr. 23, 2014 Office Action from U.S. Appl. No. 12/754,367 (30 pp.).
Okazaki, Tadashi, May 20, 2014 Office Action with English translation from Japanese Application No. 2011-544583 (9 pp.).
Zemel, Irina Sopjia, Jun. 6, 2014 Office Action from U.S. Appl. No. 11/305,279 (10 pp.).
Skes, Altrev C., Jun. 20, 2014 Office Action from U.S. Appl. No. 11/818,023 (21 pp.).

* cited by examiner

CORE-FIRST NANOPARTICLE FORMATION PROCESS, NANOPARTICLE, AND COMPOSITION

CROSS-REFERENCE TO RELATED APPLICATIONS

This application is a national stage application of PCT/US2009/069680 filed on Dec. 29, 2009, which in turn claims priority to provisional application 61/141,942, filed on Dec. 31, 2008.

BACKGROUND AND SUMMARY

Polymer nanoparticles have attracted increased attention over the past several years in a variety of fields including catalysis, combinatorial chemistry, protein supports, magnets, and photonic crystals. Similarly, vinyl aromatic (e.g. polystyrene) microparticles have been prepared for uses as a reference standard in the calibration of various instruments, in medical research and in medical diagnostic tests. Such polystyrene microparticles have been prepared by anionic dispersion polymerization and emulsion polymerization.

One benefit of using nanoparticles as an additive in other materials is that they can be discrete particles conducive to uniform dispersion throughout a host composition. For certain applications nanoparticles are preferably monodisperse in size and uniform in shape. However, controlling the size of nanoparticles during polymerization and the surface characteristics of such nanoparticles, or both, can be difficult. Accordingly, achieving better control over the surface composition of such polymer nanoparticles is also desirable.

Development of nanoparticles having a surface layer or shell that can include a variety of functional groups or heteroatomic monomers that would be compatible with a wide variety of matrix materials is desirable. However, the development of a process capable of reliably producing acceptable nanoparticles with a variety of functional groups or heteroatomic monomers has been a challenging endeavor. For example, the solubility of various monomers in traditional alkane solvents has made solution polymerization a difficult process by which to achieve nanoparticles having a tailored variety of shell layers. Emulsion synthesis requires the use of aqueous solutions to synthesize the nanoparticles and many functional monomers and initiators are not suitable to be used in aqueous solutions. In addition, emulsion synthesis also requires a large amount of surfactants, which may be undesirable for several reasons. Furthermore, functionalizing nanoparticles with certain functional groups can be difficult, if not impossible, because the functional group must be stable enough to survive the nanoparticle formation steps. In addition, post-nanoparticle formation functionalization may cause nanoparticles to bond together, leading to loss of their discrete nature.

Herein, a method is provided for synthesizing a core-shell nanoparticle that includes the following steps: providing a polymeric seed (in a solvent) that includes a mono-vinyl monomer cross-linked with a cross-linking agent to form the core of the nanoparticle, the core has an average diameter of about 5 nanometers to about 10,000 nanometers, and the core has polymer chains with living ends; adding a stabilizer to stabilize the seed and prevent the seed from precipitating out of solution; and grafting and/or polymerizing a shell species onto the living ends of the core to form the shell of the nanoparticle.

In addition, a method for making a rubber composition is provided. The method includes the steps of: making a core-shell nanoparticle(s) as described in the preceding paragraph and adding the core-shell nanoparticle(s) to a vulcanizable rubber matrix to form a rubber composition.

A method for making a tire is also provided. The method includes the steps of making core-shell nanoparticles as described above; adding the core-shell nanoparticles to a rubber composition; molding the rubber composition into a tire tread; and constructing a tire using the tire tread.

Furthermore, a core-shell nanoparticle is also provided. The core-shell nanoparticle includes a core formed from a polymeric seed that includes a mono-vinyl monomer cross-linked with a cross-linking agent, the core having an average diameter of about 5 nanometers to about 10,000 nanometers. A shell comprising a shell species is grafted and/or polymerized to the core, the shell being substantially uncrosslinked.

Herein throughout, unless specifically stated otherwise: "vinyl-substituted aromatic hydrocarbon" and "alkenylbenzene" are used interchangeably; and "rubber" refers to rubber compounds, including natural rubber, and synthetic elastomers including styrene-butadiene rubber and ethylene propylene rubber, which are known in the art. Furthermore, the terms "a" and "the," as used herein, mean "one or more."

DETAILED DESCRIPTION

Figure 1:
FIG. 1 is an SEM photo with a 100 nm scale depicting nanoparticles formed with the core-first process.

A highly versatile method for forming core-shell nanoparticles of various shell species is described herein. This method forms the nanoparticle core prior to the formation shell by synthesizing a relatively large cross-linked seed and using living dispersion polymerization to stabilize the seed to keep it in solution. The shell may then be grafted and/or polymerized to the seed, allowing for the potential use of many different types of shell species, such as heteroatomic polymers, hydrocarbon polymers, oligomers, macrocyclic molecules, and monomers. In an embodiment the method may be performed in a single batch, and there is no requirement to isolate and dry the core before grafting and/or polymerizing the shell. This example method enables production of functional nanoparticles with different sizes, well-defined internal and surface structures, and carefully tailored interfaces. Nanoparticles synthesized by this method are demonstrated to be useful as reinforcing agents and performance enhancing additives in rubber compounds. The nanoparticles having an uncrosslinked shell demonstrated surprisingly low compound viscosity properties and improved wet and possible snow traction when incorporated into a rubber composition.

In an embodiment a polymeric seed is provided in a solvent. The seed comprises a polymerized mono-vinyl monomer that is cross-linked with a cross-linking agent. The polymerized mono-vinyl polymeric chains are held together by the cross-linking agent in a relatively dense, stable core thereby enhancing the uniformity and permanence of shape and size of the resultant nanoparticle.

The polymerization is conducted by living dispersion polymerization, such as living anionic dispersion polymerization or living free radical dispersion polymerization. Living anionic dispersion polymerization may be favorable over free radical dispersion polymerization for some applications. In dispersion polymerization, the reaction is effected by polymerizing a monomer(s) in an organic liquid in which the resulting polymer is insoluble, using a steric stabilizer to stabilize the resulting particles of insoluble polymer in the organic liquid. Dispersion polymerization is used to prevent the seed from precipitating out of solution. This technique allows for a sizable seed to be formed into a core in a range of about 5 nanometers up to about 10,000 nanometers while remaining in solution. Consequently, a wide range of solvents may be used in which the polymeric seed would be otherwise insoluble.

In a generalized example seed-formation step, a reactor is provided with a hydrocarbon solvent, into which a mono-vinyl monomer species and a steric stabilizer, such as polystyrene-polybutadiene diblocks, are added. A polymerization initiator is added to the reactor along with a crosslinking agent. The cross-linking agent and initiator may be added in one charge to the reactor. A randomizing agent may also be added to the reactor. A polymeric mono-vinyl core cross-linked with a cross-linking agent is thus formed, wherein the mono-vinyl polymer chains have living ends at the surface. The living ends are at the surface of the core due to their higher affinity to the solvent than the mono-vinyl species. The surface of the core is stabilized by the steric stabilizer, which is adsorbed on the surface of the core.

Specific examples of the mono-vinyl monomer species include mono-vinyl aromatic species, such as styrene, α-methylstyrene, 1-vinyl naphthalene, 2-vinyl naphthalene, 1-α-methyl vinyl naphthalene, 2-α-methyl vinyl naphthalene, vinyl toluene, methoxystyrene, t-butoxystyrene, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons, and mixtures thereof. Further examples of mono-vinyl monomer species include non-aromatic mono-vinyl monomer species, such as vinyl acetate, vinyl-methacrylate, and vinyl-alcohols.

Crosslinking agents that are at least bifunctional, wherein the two functional groups are capable of reacting with the mono-vinyl species of the core are acceptable. Examples of suitable cross-linking agents include multiple-vinyl monomers and multiple-vinyl aromatic monomers in general. Specific examples of cross-linking agents include di- or tri-vinyl-substituted aromatic hydrocarbons, such as diisopropenylbenzene, divinylbenzene, divinyl ether, divinyl sulphone, diallyl phthalate, triallyl cyanurate, triallyl isocyanurate, 1,2-polybutadiene, N,N'-m-phenylenedimaleimide, N,N'-(4-methyl-m-phenylene)dimaleimide, triallyl trimellitate acrylates, methacrylates of polyhydric $C_2$-$C_{10}$ alcohols, acrylates and methacrylates of polyethylene glycol having from 2 to 20 oxyethylene units, polyesters composed of aliphatic di- and/or polyols, or maleic acid, fumaric acid, and itaconic acid.

Specific examples of suitable steric stabilizers include styrene-butadiene diblock copolymer, polystyrene-b-polyisoprene, and polystyrene-b-polydimethylsiloxane.

As mentioned above, the dispersion polymerization technique allows for a variety of solvents. Polar solvents, including water, and non-polar solvents may be used; however, hydrocarbon solvents are beneficial for some applications. Specific example solvents include aliphatic hydrocarbons, such as pentane, hexane, heptane, octane, nonane, and decane, as well as alicyclic hydrocarbons, such as cyclohexane, methyl cyclopentane, cyclooctane, cyclopentane, cycloheptane, cyclononane, and cyclodecane. These hydrocarbons may be used individually or in combination. However, as more fully described herein below, selection of a solvent in which one polymer forming the nanoparticles is more soluble than another polymer forming the nanoparticles is important in micelle formation.

A 1,2-microstructure controlling agent or randomizing modifier is optionally used to control the 1,2-microstructure in the mono-vinyl monomer units of the core. Suitable modifiers include 2,2-bis(2'-tetrahydrofuryl)propane, hexamethylphosphoric acid triamide, N,N,N',N'-tetramethylethylene diamine, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric Oxalanyl propanes (OOPs), 2,2-bis-(4-methyl dioxane), and bistetrahydrofuryl propane. A mixture of one or more randomizing modifiers also can be used. The ratio of the modifier to the monomers can vary from a minimum as low as about 0 to a maximum as great as about 4000 millimoles, for example about 0.01 to about 3000 millimoles of modifier per hundred grams of monomer currently being charged into the reactor. As the modifier charge increases, the percentage of 1,2-microstructure (vinyl content) increases in the conjugated diene contributed monomer units in the surface layer of the polymer nanoparticle. The 1,2-microstructure content of the conjugated diene units is, for example, within a range of about 5% and about 95%, such as less than about 35%.

Suitable initiators for the core formation process include anionic initiators that are known in the art as useful in the polymerization of mono and multiple-vinyl monomers. Exemplary organo-lithium initiators include lithium compounds having the formula $R(Li)_x$, wherein R represents a $C_1$-$C_{20}$ hydrocarbyl radical, such as a $C_2$-$C_8$ hydrocarbyl radical, and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, and t-butyl.

Specific examples of initiators include ethyllithium, propyllithium, n-butyllithium, sec-butyllithium, and tert-butyllithium; aryllithiums, such as phenyllithium and tolyllithium; alkenyilithiums such as vinyllithium, propenyllithium; alkylene lithium such as tetramethylene lithium, and pentamethylene lithium. Among these, n-butyllithium, sec-butyllithium, tert-butyllithium, tetramethylene lithium, and mixtures thereof are specific examples. Other suitable lithium initiators include one or more of; p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

Free radical initiators may also be used in conjunction with a free radical polymerization process. Examples of free-radical initiators include: 2,2'-azo-bis(isobutyronitril, 1,1'-azobis (cyclohexanecarbonitrile), 2,2'-azobis(2-methylpropionamidine) dihydrochloride, 2,2'-azobis(2-methylpropionitrile), 4,4'-azobis(4-cyanovaleric acid), 1,1-bis(tert-amylperoxy) cyclohexane, 1,1-bis(tert-butylperoxy)-3,3,5-trimethylcyclohexane, 1,1-bis(tert-butylperoxy)cyclohexane, 2,2-bis (tert-butylperoxy)butane, 2,4-pentanedione peroxide, 2,5-bis (tert-butylperoxy)-2,5-dimethylhexane, 2,5-bis(tert-butylperoxy)-2,5-dimethylhexane, 2-butanone peroxide, 2-butanone peroxide, 2-butanone peroxide, benzoyl peroxide, cumene hydroperoxide, di-tert-amyl peroxide, dicumyl peroxide, lauroyl peroxide, tert-butyl hydroperoxide, ammonium persulfate, hydroxymethanesulfinic acid monosodium salt dehydrate, potassium persulfate, and reagent grade sodium persulfate.

Functionalized lithium initiators are also contemplated as useful in the polymerization of the core species. A functionalized initiator would serve to functionalize the core, and the functional groups would likely be distributed throughout the surface and interior of the core. Example functional groups include amines, formyl, carboxylic acids, alcohols, tin, silica, and mixtures thereof.

Amine-functionalized initiators, include those that are the reaction product of an amine, an organo lithium, and a solubilizing component. The initiator has the general formula:

(A)Li(SOL)$_y$, where y is from 1 to 3; SOL is a solubilizing component selected from the group consisting of hydrocarbons, ethers, amines or mixtures thereof; and, A is selected from the group consisting of alkyl, dialkyl and cycloalkyl amine radicals having the general formula:

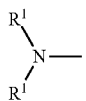

and cyclic amines having the general formula:

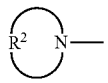

where $R^1$ is selected from the group consisting of alkyls, cycloalkyls or aralkyls having from 1 to 12 carbon atoms, and $R^2$ is selected from the group consisting of an alkylene, substituted alkylene, oxy- or N-alkylamino-alkylene group having from 3 to 16 methylene groups. A specific example of a functionalized lithium initiator is hexamethylene imine propyllithium.

Tin functionalized lithium initiators may also be useful in synthesizing the nanoparticles. Suitable tin functionalized lithium initiators include tributyl tin lithium, trioctyl tin lithium, and mixtures thereof.

Anionic initiators generally are useful in amounts ranging from about 0.01 to about 60 millimoles per hundred grams of monomer charge. Free radical initiators are useful in amounts ranging from about 6-100 millimoles per hundred grams of monomer charge.

The core may range in size from about 5 nanometers to about 10,000 nanometers, for example about 25 to about 1,000 nanometers, about 40 to about 150 nanometers, or about 50 to about 125 nanometers.

The shell of the example nanoparticles is formed by grafting and/or polymerizing a shell species onto the living ends of the cross-linked core. The nanoparticle is thus formed with polymers or copolymers extending from the cross-linked core into uncrosslinked shell. The shell species can be selected from a variety of oligomers, polymers, monomers, or macromolecules and functionalized versions of all of these.

Because the shell is formed last, the shell species does not need to be as stable as it would if it were formed first and had to survive the core formation and cross-linking process. Thus, the core-first process can produce many new nanoparticles that were difficult or impossible to make with the shell first process. In addition, the example core-first process provides an easier and more reliable method to make functionalized nanoparticles in general.

In one example, the shell species is a polymer that has already been polymerized in a separate reactor and then added to the reactor that holds the core with living ends. An addition of the preformed polymer to the reactor containing the core would result in the polymer chains being grafted to the cross-linked core, thereby forming a shell with polymer brushes. The term "polymer brushes" or "brush-like surface" as used herein, is used to mean the uncrosslinked polymers that extend into the shell of the nanoparticles. The term "brushes" denotes the uncrosslinked nature of the polymer chains in the shell, A "brush-like surface" is a surface wherein most of the polymer chains have a free chain end. Alternatively, the preformed polymer may be functionalized with a functional initiator, a functional terminator, or both in the separate reactor and then grafted onto the living ends of the core, thereby forming functionalized polymer brushes in the shell of the nanoparticle.

In another example, the shell species is added as a monomer to the reactor containing the core and polymerized with initiator in the same reactor. The shell would thus comprise polymer brushes of the shell species. Optionally, functional terminators could be used to functionalize the polymer brushes of the shell.

In another example, the shell species is a monomer containing a heteroatom. The heteroatomic monomer is polymerized as described above to form the shell.

In another example, the shell species is a single monomer unit. The unit may be a hydrocarbon or contain one or more heteroatoms, and it may be functionalized. The monomer is added and polymerizes via the living ends of the core.

In another example the shell species is a macromolecule having a molecular weight up to about 10,000 g/mol or an oligomer. The shell species is added to the reactor containing the core. The macromolecule or oligomer is thus grafted onto the living ends of the core. Various functional groups may be present in the macromolecule or oligomer.

In another example the shell species is itself a functional terminator. When added to the reactor containing the core, the functional terminator terminates the living ends of the core. In this example, the functional group(s) is considered the shell.

The weight percent of the shell species may range from about $1 \times 10^{-5}\%$ to about 75% of the entire nanoparticle weight, such as about $1 \times 10^{-5}\%$ to about 5% when the shell species is a functional terminator for the living ends of the core, or about 1% to about 75%, such as 3% to 50%, or 5% to 25% when the shell species is macromolecule or has more than one "mer" unit.

Example shell species generally include hydrocarbons, heteroatomic species, polar functionalized species, water-soluble species, and thermoplastic and plastic elastomers.

Hydrocarbon shell species include $C_4$ to $C_8$ conjugated dienes, such as, 1,3-butadiene, isoprene, and 1,3-pentadiene. Olefinic species such as ethylene, propylene, isobutylene, and cyclohexene may also be used.

Heteroatomic shell species include species containing O, N, S, P, Cl, Ti, and Si atoms, such as, epoxides, urethanes, esters, ethers, imides, amines, carbonates, siloxanes, halogens, metals, synthetic oils, and vegetable oils. Specific examples include, polydimethylsiloxane (PDMS), polyethylene oxide (PEO), halogenated butyl rubber, polyethylene teraphthalate (PET), polyethylene glycol (PEG), polyphenylene oxide (PPO), poly(propylene glycol) diglycidyl ether (PPO- EO2), polyvinyl alcohol, pyridine, carbazole, imidazole, diethylamino-styrene, and pyrrolidone. Example macromolecules or oligomers include polyethylene glycol, polyphenylene oxide, and polydimethylsiloxane.

In a particular embodiment, the shell species is a fatty acid ester, triglyceride, or vegetable oil. Such oil-brushed nanoparticles synergistically enhance the capability of the nanoparticles as reinforcing agents and processing additives in rubber compounds. For example, in the non-limiting Examples disclosed herein, a castor oil-brushed nanoparticle is shown to enhance tensile strength and wet traction without an increase of compound Mooney, and in addition, reduced hysteresis and Payne effect without trading off other properties are also displayed.

Functional terminators for use with or as the shell species include $SnCl_4$, $R_3SnCl$, $R_2SnCl_2$, $RSnCl_3$, carbodiimides, N-methylpyrrolidine, cyclic amides, cyclic ureas, isocyanates, Schiff bases, 4,4'-bis(diethylamino) benzophenone, N,N'-dimethylethyleneurea, and mixtures thereof, wherein R is selected from the group consisting of alkyls having from about 1 to about 20 carbon atoms, cycloalkyls having from about 3 to about 20 carbon atoms, aryls having from about 6 to about 20 carbon atoms, aralkyls having from about 7 to about 20 carbon atoms, and mixtures thereof.

The size of the entire core-shell nanoparticles, including both core and shell—expressed as a mean number average diameter—are, for example, between about 5 and about 20,000 nanometers, such as about 50 to about 5,000 nanometers, about 75 to about 300 nanometers, or about 75 to about 150 nanometers.

For some applications the nanoparticles are preferably substantially monodisperse and uniform in shape. The dispersity is represented by the ratio of $M_w$ to $M_n$, with a ratio of 1 being substantially monodisperse. The nanoparticles may, for example, have a dispersity less than about 1.3, such as less than about 1.2, or less than about 1.1. Moreover, the nanoparticles may be spherical, though shape defects are acceptable, provided the nanoparticles generally retain their discrete nature with little or no polymerization between particles.

With respect to the monomers and solvents identified herein, nanoparticles are formed by maintaining a temperature that is favorable to polymerization of the selected monomers in the selected solvent(s). Reaction temperatures are, for example, in the range of about −40 to about 250° C., such as a temperature in the range of about 0 to about 150° C.

Additionally, the shell species may include copolymers, including random and block copolymers. These other blocks may include the hydrocarbon and heteroatomic monomers listed above. The copolymer shell species may be synthesized prior to introducing the species into the reactor with the core, or it may be polymerized after introduction into the reactor as described above.

Pre-formed multi-block polymers, are believed to aggregate to form micelle-like structures around the core, with the block that is the least soluble in the solvent directed toward the centers of the core and all other blocks as tails or brushes extending therefrom. For example, in a hydrocarbon solvent, vinyl-substituted aromatic blocks are directed toward the centers of the core and other blocks extend as tails therefrom. It is noted that a further hydrocarbon solvent charge or a decrease in polymerization mixture temperature may also be used, and may in fact be required, to obtain formation of the micelles. Moreover, these steps may be used to take advantage of the general insolubility of a vinyl-aromatic block. An exemplary temperature range for this step is between about −80 and about 100° C., such as between about 20° C. and about 80° C.

After the formation of the nanoparticle core and shell, and prior to the termination of the living end, additional monomer charge(s), such as conjugated diene monomer and/or vinyl-substituted aromatic hydrocarbon monomer, can be added to the polymerization mixture as desired. The sequential addition of various monomers allows growth of particle size and formation of the shell with different internal structure.

The embodiments of nanoparticles described herein are substantially discrete, for example the nanoparticles have less than 20% cross-linking between nanoparticles, such as less than 15% or less than 10% cross-linking between nanoparticles.

The number average molecular weight (Mn) of the entire nanoparticle may be controlled within the range of from about 10,000 to about 200,000,000, within the range of from about 50,000 to about 1,000,000, or within the range of from about 100,000 to about 500,000. The polydispersity (the ratio of the weight average molecular weight to the number average molecular weight) of the polymer nanoparticle may be controlled within the range of from about 1 to about 2.0, within the range of from about 1 to about 1.5, or within the range of from about 1 to about 1.2.

The Mn may be determined by using Gel Permeation Chromatography (GPC) calibrated with polystyrene standards and adjusted for the Mark-Houwink constants for the polymer in question. The Mn values used in the examples below were measured by GPC methods calibrated with linear polymers.

In one example, the core of the synthesized nanoparticles is relatively hard; that is, the core has a Tg of about 60° C. or higher. In another example, the nanoparticles have a core that is relatively harder than the shell, for example, at least about 60° C. higher than the Tg of the shell layer, or at least about 1° C. higher than the Tg of the shell layer. In one example, the shell layer is soft; that is, the shell layer has a Tg lower than about 0° C. In one embodiment, the Tg of the shell layer is between about 0° C. and about −100° C. Nanoparticles with hard cores and soft shells are particularly useful for reinforcing rubber compounds used for tire treads.

The Tg of the polymers in the nanoparticles can be controlled by the selection of monomers and their molecular weight, styrene content, and vinyl content.

Polymer Nanoparticle Applications

A variety of applications are contemplated for use in conjunction with the example nanoparticles. Furthermore, the several mechanisms described herein for modifying the nanoparticles render them more suitable for different applications. All forms of the example nanoparticles are, of course, contemplated for use in each of the exemplary applications and all other applications envisioned by the skilled artisan.

General Rubber

After the nanoparticles have been formed, they may be blended with a rubber to improve the physical characteristics of the rubber composition. Nanoparticles are useful modifying agents for rubbers because they are discrete particles which are capable of dispersing uniformly throughout the rubber composition, resulting in uniformity of physical characteristics.

The present polymer nanoparticles are suitable for modifying a variety of rubbers including, but not limited to, random styrene/butadiene copolymers, butadiene rubber, poly (isoprene), natural rubber, ethylene-propylene, nitrile rubber, polyurethane, butyl rubber, EPDM, and silicone rubber.

Furthermore, nanoparticles with hydrogenated layers may demonstrate improved compatibility with specific rubbers. For example, nanoparticles including a hydrogenated poly isoprene layer may demonstrate superior bonding with and improved dispersion in an EPDM rubber matrix due to the compatibility of hydrogenated isoprene with EPDM rubber. U.S. Pat. No. 6,689,469 to Wang describes methods for hydrogenating nanoparticles and is herein incorporated by reference.

Additionally, nanoparticles with copolymer layers may demonstrate improved compatibility with rubbers. The copolymer tails within a layer of the nanoparticles may form a brush-like surface. The host composition is then able to diffuse between the tails allowing improved interaction between the host and the nanoparticles.

Nanoparticles with a shell species that includes siloxane groups may exhibit improved interaction in silica filled rubber compositions. Nanoparticles with shell species that include vegetable or synthetic oils may enhance the processability of the rubber matrix.

Nanoparticles with shell species that include pyridine, carbazole, imidazole, diethylamino-styrene, pyrrolidone, polyethylene glycol (PEG), polydimethylsiloxane (PDMS), polyphenylene oxide (PPO), and poly(propylene glycol) that are mixed with silica and carbon black filled rubbers have been shown to give improved properties such as G' with no significant increase in Mooney viscosity.

Hard Disk Technology

Hydrogenated nanoparticles may also find application in hard disk technology.

Disk drive assemblies for computers traditionally include a magnetic storage disk coaxially mounted about a spindle apparatus that rotates at speeds in excess of several thousand revolutions per minute (RPM). The disk drive assemblies also include a magnetic head that writes and reads information to and from the magnetic storage disk while the magnetic disk is rotating. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from the environmental contaminant outside of the housing.

Serious damage to the magnetic disks, including loss of valuable information, can result by introducing gaseous and particulate contaminates into the disk drive assembly housing. To substantially prevent or reduce the introduction of gaseous and particulate contaminants into the disk drive housing, a flexible sealing gasket is disposed between the disk drive mounting base (support) plate and the disk drive assembly housing or cover plate. A sealing gasket is usually prepared by punching out a ring-shaped gasket from a sheet of cured elastomer. The elastomeric gasket obtained is usually attached to the base plate of the disk drive assembly mechanically, such as affixing the gasket with screws, or adhesives.

Thermoplastic Gels

Nanoparticles prepared in accord with the present disclosure, whether hydrogenated or non-hydrogenated may also be blended with a variety of thermoplastic elastomers, such as SEPS, SEBS, EEBS, EEPE, polypropylene, polyethylene, polystyrene, and mixtures thereof. For example, nanoparticles with hydrogenated isoprene layers may be blended with an SEPS thermoplastic to improve tensile strength and thermostability. These blends of thermoplastic elastomer and nanoparticles would typically be extended as known in the art. For example, suitable extenders include extender oils and low molecular weight compounds or components. Suitable extender oils include those well known in the art such as naphthenic, aromatic and paraffinic petroleum oils and silicone oils.

Examples of low molecular weight organic compounds or components useful as extenders in compositions containing nanoparticles are low molecular weight organic materials having a number-average molecular weight of less than about 20,000, for example less than about 10,000, or less than about 5000. Although there is no limitation to the material which may be employed, the following is a list of examples of appropriate materials:

(1) Softening agents, namely aromatic naphthenic and araffinic softening agents for rubbers or resins;

(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumaronein-dene resins, terpene phenol resins, petroleum hydrocarbons and rosin derivative;

(4) Oligomers, namely crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, and polychloroprene), silicone oligomers, and poly-a-olefins;

(5) Lubricants, namely hydrocarbon lubricants such as paraffin and wax, fatty acid lubricants such as higher fatty acid and hydroxyl-fatty acid, fatty acid amide lubricants such as fatty acid amide and alkylene-bisfatty acid amide, ester lubricants such as fatty acid-lower alcohol ester, fatty acid-polyhydrie alcohol ester and fatty acid-polyglycol ester, alcoholic lubricants such as fatty alcohol, polyhydric alcohol, polyglycol and polyglycerol, metallic soaps, and mixed lubricants; and, (6) Petroleum hydrocarbons, namely synthetic terpene resins, aromatic hydrocarbon resins, aliphatic hydrocarbon resins, aliphatic or alicyclic petroleum resins, polymers of unsaturated hydrocarbons, and hydrogenated hydrocarbon resins.

Other appropriate low-molecular weight organic materials include latexes, emulsions, liquid crystals, bituminous compositions, and phosphazenes. One or more of these materials may be used as extenders.

Surface functionalized nanoparticles prepared in accordance with the present disclosure, whether hydrogenated or non-hydrogenated, may also be compounded with silica containing rubber compositions. Including surface functionalized nanoparticles in silica containing rubber compositions has been shown to decrease the shrinkage rates of such silica containing rubber compositions. Functionalized nanoparticles may be compounded in silica compositions in concentrations up to about 50 wt % of the total composition, such as up to about 40 wt %, or up to about 30 wt %.

Tire Rubber

One application for rubber compounds with nanoparticles is in tire rubber formulations.

Vulcanizable elastomeric compositions containing nanoparticles are prepared by mixing a rubber and a nanoparticle composition, with reinforcing filler(s) comprising silica, or a carbon black, or a mixture of the two, a processing aid and/or a coupling agent, a cure agent and an effective amount of sulfur to achieve a satisfactory cure of the composition.

Example rubbers useful with the nanoparticles described above are conjugated diene polymers, copolymers or terpolymers of conjugated diene monomers and monovinyl aromatic monomers. These can be utilized as 100 parts of the rubber in the tread stock compound, or they can be blended with any conventionally employed treadstock rubber which includes natural rubber, synthetic rubber and blends thereof. Such rubbers are well known to those skilled in the art and include synthetic polyisoprene rubber, styrene-butadiene rubber (SBR), styrene-isoprene rubber, styrene-isoprene-butadiene rubber, butadiene-isoprene rubber, polybutadiene, butyl rubber, neoprene, acrylonitrile-butadiene rubber (NBR), silicone rubber, the fluoroelastomers, ethylene acrylic rubber, ethylene-propylene rubber, ethylene-propylene terpolymer (EPDM), ethylene vinyl acetate copolymer, epicholrohydrin rubber, chlorinated polyethylene-propylene rubbers, chlorosulfonated polyethylene rubber, hydrogenated nitrile rubber, and terafluoroethylene-propylene rubber.

Examples of reinforcing silica fillers which can be used in the vulcanizable elastomeric composition include wet silica (hydrated silicic acid), dry silica (anhydrous silicic acid), and calcium silicate. Other suitable fillers include aluminum silicate, and magnesium silicate. Among these, precipitated amorphous wet-process, hydrated silicas are specific examples. Silica can be employed in the amount of one to about 100 parts per hundred parts of the elastomer (phr), for example in an amount of about 5 to about 80 phr, or in an amount of about 30 to about 80 phrs. The useful upper range is limited by the high viscosity imparted by fillers of this type. Some of the commercially available silica which can be used include, but are not limited to, HiSil® 190, HiSil® 210, HiSil® 215, HiSil® 233, and HiSil® 243, produced by PPG Industries (Pittsburgh, Pa.). A number of useful commercial grades of different silicas are also available from DeGussa Corporation (e.g., VN2, VN3), Rhone Poulenc (e.g., Zeosil® 1165 MP0, and J.M. Huber Corporation.

Including surface functionalized nanoparticles in silica containing rubber compositions has been shown to decrease the shrinkage rates of such silica containing rubber compositions. Functionalized nanoparticles may be compounded in silica compositions in concentrations up to 30 wt % of the total composition, such as up to about 40 wt %, or up to about 50 wt %.

The rubber can be compounded with all forms of carbon black and optionally additionally with silica. The carbon black can be present in amounts ranging from one to 100 phr. The carbon black can include any of the commonly available, commercially-produced carbon blacks, such as those having a surface area of at least 20 $m^2/g$ or at least 35 $m^2/g$ up to 200 $m^2/g$ or higher. Among useful carbon blacks are furnace black, channel blacks, and lamp blacks. A mixture of two or more of the above blacks can be used in preparing the carbon black compositions. Typical suitable carbon black are N-110, N-220, N-339, N-330, N-352, N-550, N-660, as designated by ASTM D-1765-82a.

Certain additional fillers can be utilized including mineral fillers, such as clay, talc, aluminum hydrate, aluminum hydroxide and mica. The foregoing additional fillers are optional and can be utilized in the amount of about 0.5 phr to about 100.

Numerous coupling agents and compatibilizing agents are known for use in combining silica and rubber. Among the silica-based coupling and compatibilizing agents include silane coupling agents containing polysulfide components, or structures such as, for example, trialkoxyorganosilane polysulfides, containing from 2 to 8 sulfur atoms in a polysulfide bridge such as, for example, bis-(3-triethoxysilylpropyl) tetrasulfide (Si69), bis-(3-triethoxysilylpropyl) disulfide (Si75), and those alkyl alkoxysilanes of the such as octyltriethoxy silane, and hexyltrimethoxy silane.

It is readily understood by those having skill in the art that the rubber composition would be compounded by methods generally known in the rubber compounding art, such as mixing the various vulcanizable polymer(s) with various commonly used additive materials such as, for example, curing agents, activators, retarders and accelerators processing additives, such as oils, resins, including tackifying resins, plasticizers, pigments, additional filers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in the conventional amounts.

Engineering Plastic and Others

Similarly, the nanoparticles can be added into typical plastic materials, including polyethylene, polypropylene, polystyrene, polycarbonate, nylon, and polyimides, to for example, enhance impact strength, tensile strength and damping properties.

Of course, the present inventive nanoparticles are also suited to other presently existing applications for nanoparticles, including the medical field, e.g. drug delivery and blood applications, information technology, e.g. quantum computers and dots, aeronautical and space research, energy, e.g., oil refining, and lubricants.

Engine Mount

Another application for such rubbers is in situations requiring superior damping properties, such as engine mounts and hoses (e.g. air conditioning hoses). Rubber compounds of high mechanical strength, super damping properties, and strong resistance to creep are demanded in engine mount manufacturers. In engine mounts, a rubber, because it sits most of its life in a packed and hot position, requires very good characteristics. Utilizing the nanoparticles within selected rubber formulations can improve the characteristics of the rubber compounds.

The present invention now will be described with reference to non-limiting working examples. The following examples and tables are presented for purposes of illustration only and are not to be construed in a limiting sense.

EXAMPLES

A 0.8 liter nitrogen-purged glass bottle sealed with a septum liner and perforated crown cap was used as the reactor vessel for the examples below. 1,3-butadiene (22 wt % in hexane), styrene (33 wt % in hexane), hexane, n-butyllithium (1.60 M in hexane), 2,2-bis(2'-tetrahydrofuryl)propane (1.60 M in hexane, stored over calcium hydride) and BHT solution in hexane were also used. Commercially available reagents were obtained from Aldrich and Gelest Inc. (Morrisville, Pa.) and dried over molecular sieves (3 Å).

Example 1

Nanoparticles Functionalized with
4-[2-Trichlorosilyl]ethylpyridine 49 g of hexane, 62 g of 34 wt % styrene and 9 ml of 5% Stereon 730AC (polystyrene-b-polybutadiene: styrene 30.6%, vinyl 8.8%, Mn 134 kg/mol) were added to the reactor. The reactor was then charged with 1.6 ml of 1.4 M sec-butyl lithium at room temperature. After approximately 1 hour, 0.1 ml of 1.6 M 2,2'-di(tetrahydrofuryl)propane and 111 g of 22 wt % 1,3-butadiene were added to the charge. After 1 day, 39 g of 33 wt % styrene was added to the charge and stirred overnight. 2 ml of divinylbenzene (DVB) was added to the reactor. After approximately 3 hours, 1.5 ml of 17.5% 4-[2-trichlorosilyl]ethylpyridine was added to the polymer in solution (cement) and stirred overnight. The cement was coagulated in isopropanol and vacuum dried.

The particle size was determined by a number average method by viewing an SEM as shown in FIG. 1. The particle size was about 50 nm. The styrene/DVB/BD particles had a weight distribution of 58.4/3.1/38.5, respectively, based on the unfunctionalized particle weight. The weight percent of the 4-[2-trichlorosilyl]ethylpyridine functional group was about 0.43% based on the total nanoparticle composition.

Example 2

Nanoparticles Functionalized with 9-Vinylcarbazole 49 g of hexane, 62 g of 34 wt % styrene and 9 ml of 5% Stereon 730AC (polystyrene-b-polybutadiene: styrene 30.6%, vinyl 8.8%, Mn 134 kg/mol) were added to the reactor. The reactor was then charged with 1.6 ml of 1.4 M sec-butyl lithium at room temperature. After approximately 1 hour, 0.1 ml of 1.6 M 2,2'-di(tetrahydrofuryl)propane and 111 g of 22 wt % 1,3-butadiene were added to the charge. After 1 day, 40 g of 33 wt % styrene was added to the charge. After approximately 6 hours, 2 ml of divinylbenzene (DVB) was added to the reactor and stirred overnight. 30 ml of 0.1M 9-vinylcarbazole was added to the polymer in solution (cement) and stirred for 2 days. The cement was coagulated in isopropanol and vacuum dried. The particle size was about 50 nm. The styrene/DVB/BD particles had a weight distribution of 58.4/3.1/38.5, respectively, based on the unfunctionalized particle weight. The weight percent of the 9-Vinylcarbazole functional group was less than 0.95% based on the total nanoparticle composition.

Example 3

Nanoparticles Functionalized with 1-Vinylimidazole 49 g of hexane, 72 g of 34 wt % styrene and 9 ml of 5% Stereon 730AC (polystyrene-b-polybutadiene: styrene 30.6%, vinyl 8.8%, Mn 134 kg/mol) were added to the reactor. The reactor was then charged with 1.6 ml of 1.4 M sec-butyl lithium at room temperature. After approximately 1 hour, 0.1 ml of 1.6 M 2,2'-di(tetrahydrofuryl)propane and 111 g of 22 wt % 1,3-butadiene were added to the charge. After 1 day, 38 g of 33 wt % styrene was added to the charge. After approximately 6 hours, 2 ml of divinylbenzene (DVB) was added to the reactor and stirred overnight. 30 ml of 0.1M 1-vinylimidazole was added to the polymer in solution (cement) and stirred for 2 days. The cement was coagulated in isopropanol and vacuum dried. The particle size was about 50 nm. The styrene/DVB/BD particles had a weight distribution of 60/3/37, respectively, based on the unfunctionalized particle weight. The weight percent of the 1-vinylimidazole functional group was less than 0.43%, based on the total nanoparticle composition.

Example 4

Nanoparticles Functionalized with p-Diethylaminostyrene 49 g of hexane, 62 g of 34 wt % styrene and 9 ml of 5% Stereon 730AC (polystyrene-b-polybutadiene: styrene 30.6%, vinyl 8.8%, Mn 134 kg/mol) were added to the reactor. The reactor was then charged with 1.6 ml of 1.4 M sec-butyl lithium at room temperature. After approximately 1 hour, 0.1 ml of 1.6 M 2,2'-di(tetrahydrofuryl)propane and 111 g of 22 wt % 1,3-butadiene were added to the charge. After 1 day, 30 g of 33 wt % styrene was added to the charge. After approximately 3 hours, 2 ml of divinylbenzene (DVB) was added to the reactor and stirred overnight. 2 ml of p-diethylaminostyrene was added to the polymer in solution (cement) and stirred for 1 day. The cement was coagulated in isopropanol and vacuum dried. The particle size was about 50 nm. The styrene/DVB/BD particles had a weight distribution of 56/4/40, respectively, based on the unfunctionalized particle weight. The weight percent of the p-diethylaminostyrene functional group was about 3% based on the total nanoparticle composition.

Example 5

Nanoparticles Functionalized with Tetrakis[(N-(1-ethyl)-2-pyrrolidone)-dimethylsiloxy)

49 g of hexane, 62 g of 34 wt % styrene and 9 ml of 5% Stereon 730AC (polystyrene-b-polybutadiene: styrene 30.6%, vinyl 8.8%, Mn 134 kg/mol) were added to the reactor. The reactor was then charged with 1.6 ml of 1.4 M sec-butyl lithium at room temperature. After approximately 1 hour, 0.1 ml of 1.6 M 2,2'-di(tetrahydrofuryl)propane and 111 g of 22 wt % 1,3-butadiene were added to the charge. After 1 day, 40 g of 33 wt % styrene was added to the charge. After approximately 3 hours, 2 ml of divinylbenzene (DVB) was added to the reactor and stirred overnight, 16 ml of 0.1M tetrakis[(N-(1-ethyl)-2-pyrrolidone)-dimethylsiloxy) was added to the polymer in solution (cement) and stirred overnight. The cement was coagulated in isopropanol and vacuum dried. The particle size was about 50 nm. The styrene/DVB/BD particles had a weight distribution of 58.4/3.1/38.5, respectively, based on the unfunctionalized particle weight. The weight percent of the tetrakis[(N-(1-ethyl)-2-pyrrolidone)-dimethylsiloxy) functional group was about 1.95%, based on the total nanoparticle composition.

Example 6

Nanoparticles Functionalized with N-Vinylcarbazole 45 g of hexane, 68 g of 34 wt % styrene and 2.5 ml of 5% Stereon 730AC (polystyrene-b-polybutadiene: styrene 30.6%, vinyl 8.8%, Mn 134 kg/mol) were added to the reactor. The reactor was then charged with 1.4 ml of 1.4 M sec-butyl lithium at room temperature. After approximately 2 hour, 0.1 ml of 1.6 M 2,2'-di(tetrahydrofuryl)propane and 111 g of 22 wt % 1,3-butadiene were added to the charge and stirred overnight. 40 g of 33 wt % styrene was then added to the charge. After approximately 2 hours, 2 ml of divinylbenzene (DVB) was added to the reactor and stirred for 3 hours. 40 ml of 0.1M N-vinylcarbazole was added to the polymer in solution (cement) and stirred for 2 days. The cement was coagulated in isopropanol and vacuum dried. The particle size was about 50 nm. The styrene/DVB/BD particles had a weight distribution of 60/3/37, respectively, based on the unfunctionalized particle weight. The weight percent of the N-vinylcarbazole functional group was about 0.95%, based on the total nanoparticle composition.

Example 7

Nanoparticles Functionalized with Tetrakis[(N-(1-ethyl)-2-pyrrolidone)-dimethylsiloxy)

49 g of hexane, 60 g of 34 wt % styrene and 9 ml of 5% Stereon 730AC (polystyrene-b-polybutadiene: styrene 30.6%, vinyl 8.8%, Mn 134 kg/mol) were added to the reactor. The reactor was then charged with 1.6 ml of 1.4 M sec-butyl lithium at room temperature. After approximately 12 hours, 0.1 ml of 1.6 M 2,2'-di(tetrahydrofuryl)propane, 14 g of 34 wt % styrene and 24 g of 22 wt % 1,3-butadiene were added to the charge. Two additions of 17 g of 33 wt % styrene and 44 g of 22 wt % 1,3-butadiene were incrementally charged after approximately 2 hours. After stirring for 1 day, 15 ml of 0.1M tetrakis[(N-(1-ethyl)-2-pyrrolidone)-dimethylsiloxy) was added to the polymer in solution (cement) and stirred overnight. The cement was coagulated in isopropanol and vacuum dried.

Figure 2:
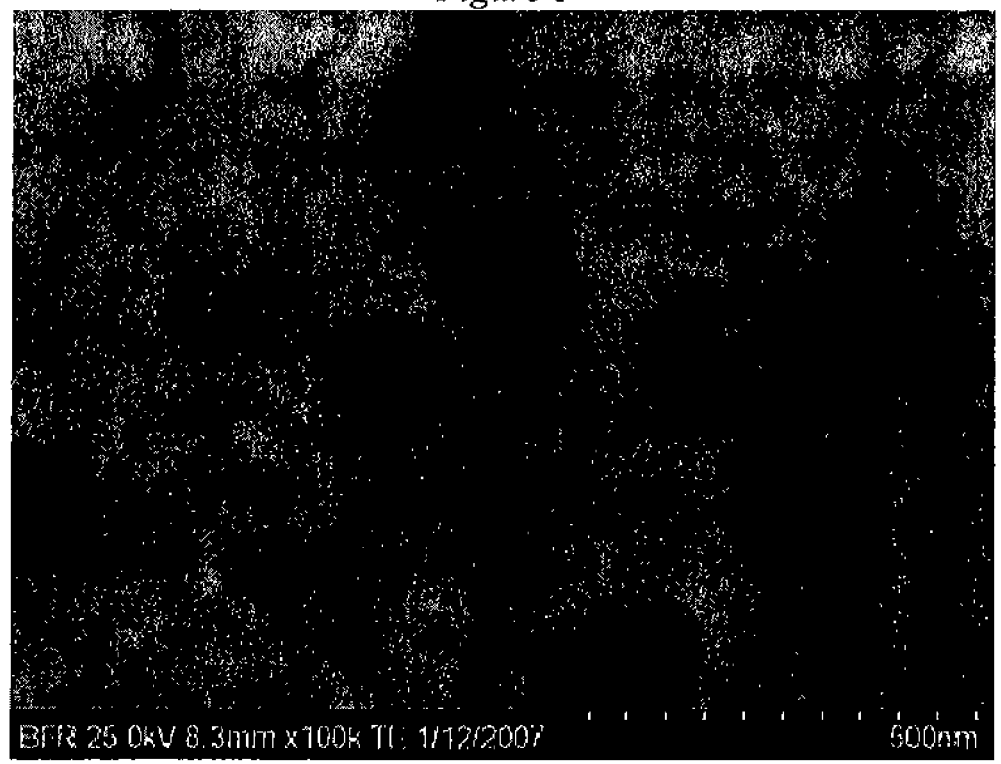
FIG. 2 is an SEM photo with a 500 nm scale depicting nanoparticles formed with the core-first process.

The particle size was determined by a number average method by viewing an SEM as shown in FIG. 2. The particle size was about 100 nm. The styrene/BD particles had a weight distribution of 74/26, respectively, based on the unfunctionalized particle weight. The weight percent of the tetrakis[(N-(1-ethyl)-2-pyrrolidone)-dimethylsiloxy) functional group was about 2% based on the total nanoparticle composition.

Example 1A

Non-Functional Core First Nanoparticles 300 g of hexane, 20 g of 33 wt % styrene and 5 ml of 10% polystyrene-polybutadiene diblock (styrene content 24.2%, vinyl 9.2%, and Mn 67 kg/mol) were added to a reactor. Then the reactor was charged with 1 ml of DVB, 2 ml of 1.6 M butyl lithium and 1 ml of 1.6 M 2,2'-di(tetrahydrofuryl)propane. After approximately 10 minutes, 30 g of 22 wt % 1,3-butadiene and 2 ml of 1.6 M 2,2'-di(tetrahydrofuryl)propane were added to the charge. After 4 hours at room temperature, the polymer in solution (cement) was terminated with isopropanol and coagulated in isopropanol and vacuum dried.

Figure 3:
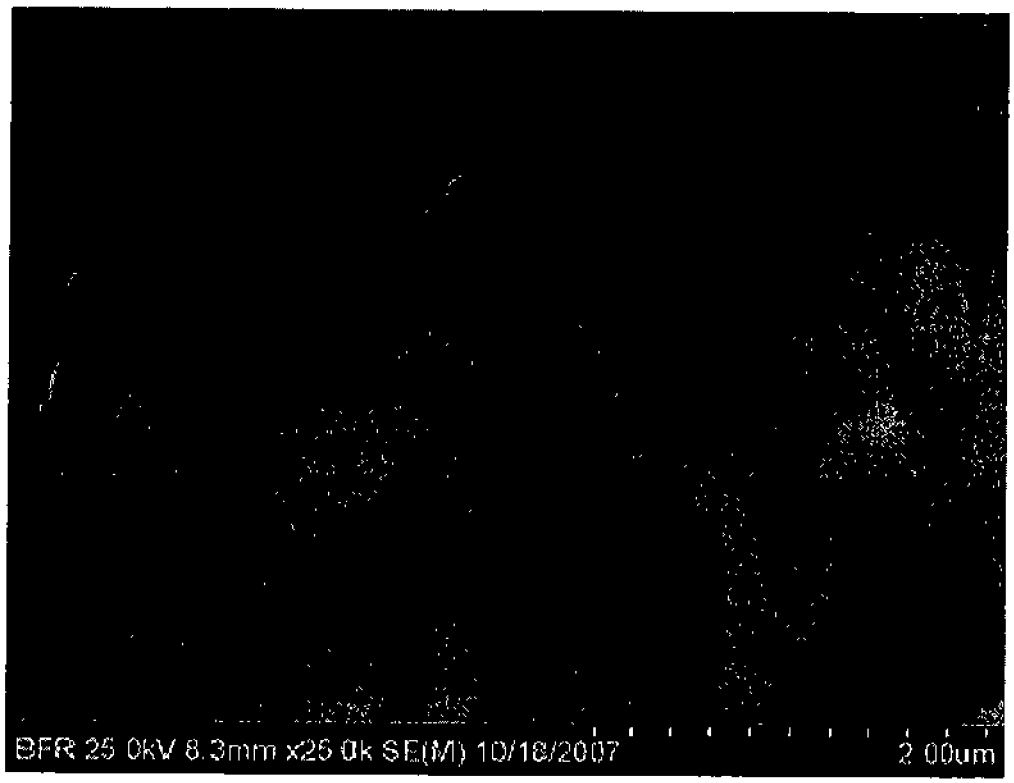
FIG. 3 is a third SEM photo with a 2 micrometer scale depicting nanoparticles formed with the core-first process.

The particle size was determined by a number average method by viewing an SEM photo as shown in FIG. 3. The particle size was about 0.6-0.8 μm. The styrene/DVB/BD particles had a weight distribution of 46.8/6.4/46.8, respectively.

Example 2A

Synthesis of Particles with a PEG Functionalized Shell 300 g of hexane, 20 g of 33 wt % styrene and 5 ml of 10% polystyrene-polybutadiene diblock (styrene content 24.2%, vinyl 9.2%, and Mn 67 kg/mol) were added to a reactor. Then the reactor was charged with 1 ml of DVB, 2 ml of 1.6 M butyl lithium and 1 ml of 1.6 M 2,2'-di(tetrahydrofuryl)propane. After approximately 10 minutes, 30 g of 22 wt % 1,3-butadiene and 2 ml of 1.6 M 2,2'-di(tetrahydrofuryl)propane were added to the charge. After about 4 hours at room temperature, 5 ml of stock solution of polyethylene glycol) diglycidyl ether (PEG-EO2, Mn=526 g/mol) was added to the cements for 30 min. The stock solution of PEG-EO2 (1M) was prepared in toluene and treated with a molecular sieve. After the color of the solution bleached, the particles were coagulated with isopropanol and dried under the vacuum. The product weight was increased about 15% compared to non-functional particles synthesized in Example 1A. The particle size was about 0.6-0.8 μm. The styrene/DVB/BD/PEG particles had a weight distribution of 39.5/5.3/39.5/15.7, respectively.

Example 3A

Synthesis of Particles with a PDMS Functionalized Shell 300 g of hexane, 20 g of 33 wt % styrene and 5 ml of 10% polystyrene-polybutadiene diblock (styrene content 24.2%, vinyl 9.2%, and Mn 67 kg/mol) were added to a reactor. Then the reactor was charged with 1 ml DVB, 2 ml of 1.6 M butyl lithium and 1 ml of 1.6 M 2,2'-di(tetrahydrofuryl)propane. After approximately 10 minutes, 30 g of 22 wt % 1,3-butadiene and 2 ml of 1.6 M 2,2'-di(tetrahydrofuryl)propane were added to the charge. After about 4 hours at room temperature, 5 ml stock solution of hexamethylcyclotrisiloxane (D3) was added to the cements for about 1 hour. The particles were coagulated with isopropanol and dried under the vacuum. The stock D3 solution (2M) was prepared in hexane and treated with a molecular sieve. The product weight was increased about 6.7% compared to non-functional particles synthesized in Example 1A. The particle size was about 0.6-0.8 μm. The styrene/DVB/BD/D3 particles had a weight distribution of 34.6/4.7/34.6/26.1, respectively.

Example 4A

Synthesis of Particles with a PPO Functionalized Shell 300 g hexane, 20 g of 33 wt % styrene and 5 ml of 10% polystyrene-polybutadiene diblock were added to a reactor. Then the reactor was charged with 1 ml DVB, 2 ml of 1.6 M butyl lithium and 1 ml of 1.6 M 2,2'-di(tetrahydrofuryl)propane. After approximately 10 minutes, 30 g of 22 wt % 1,3-butadiene and 2 ml of 1.6 M 2,2'-di(tetrahydrofuryl)propane were added to the charge. After about 4 hours at room temperature, 5 ml stock solution of poly(propylene oxide) diglycidyl ether (PPO-EO2, Mn=640 g/mol) was added to the cements for about 40 min. The stock solution of PPO-EO2 (1M) was prepared in toluene and treated with a molecular sieve. The particles were coagulated with isopropanol and dried under the vacuum. The product weight was increased about 20% compared to non-functional particles synthesized in Example 1A. The particle size was about 0.6-0.8 μm. The styrene/DVB/BD/PPO particles had a weight distribution of 38.2/5.2/38.2/18.4, respectively.

Example 1B

Synthesis of Non-Functional Core First Nanoparticles

To a 0.8 liter nitrogen-purged glass bottle was added 300 g of hexane, 20 ml of THF, 20 g of 33 wt % styrene, 10 ml of 10% PS-PB diblock (S730AC), and 0.6 ml of 50 wt % DVB. The reactor was charged with 0.5 ml of 1.6 M butyl lithium. Within 5 minutes, 5.5 ml of 50 wt % DVB was added to the charge and stirred at room temperature. After 30 minutes, 20 g of 22 wt % 1,3-butadiene and 1 ml of 1M N,N,N',N'- tetramethylethylenediamine (TMEDA) were added to the charge. After stirring at room temperature for one day, the cements were coagulated in isopropanol (IPA) and vacuum dried.

The styrene/DVB/BD particles had a weight distribution of 49/18/33, respectively.

Example 2B

Synthesis of SBR Nanoparticles with Castor Oil Brushes (Shell)

To a 0.8 liter nitrogen-purged glass bottle was added 300 g of hexane, 20 ml of THF, 20 g of 33 wt % styrene, 10 ml of 10% PS-PB diblock (S730AC) and 0.6 ml of 50 wt % DVB. The reactor was charged with 0.5 ml of 1.6 M butyl lithium. Within 5 minutes, 5.5 ml of 50 wt % DVB was added to the charge and stirred at room temperature for 30 minutes. Then, 20 g of 22 wt % 1,3-butadiene and 1 ml of 1M N,N,N',N'-tetramethylethylenediamine (TMEDA) were added to the charge. After stirring at room temperature for one day, 6 ml of castor oil glycidyl ether (10 wt % in hexane) was added to the charge. After 4 hours, the cements were coagulated in IPA and vacuum dried.

The styrene/DVB/BD/COGE particles had a weight distribution of 48/17/32/3, respectively.

Rubber Compounding Examples 9-24

Tables 1 and 2 show the general carbon black and silica composition formulation. Example 8 was a control example, compounded according to the formulation of Table 1. Examples 9-15 were compounded according to the formulation of Table 1, except the nanoparticles of Examples 1-7 were used to replace 10 phr (per hundred rubber) of the SBR polymer. Example 16 was a control example, compounded according to the formulation of Table 2. Examples 17-23 were compounded according to the formulation of Table 2, except the nanoparticles of Examples 1-7 were used to replace 10 phr (per hundred rubber) of the SBR polymer in Examples 17-23. The 10 phr of nanoparticles accounted for 5.7% by weight of the carbon black-filled compositions and 4.7% by weight of the silica-filled compositions. Tables 3 and 4 summarize the characterization of the functionalized nanoparticles and their compound properties.

TABLE 1

Carbon Black-Filled Formulation

| | Composition | phr | Mixing Conditions |
|---|---|---|---|
| Master Batches | SBR[1] | 100 | Mixer: 300 g Brabender |
| | Carbon Black (N343) | 50 | Agitation Speed: 60 rpm |
| | Aromatic Oil | 15 | Initial Temperature 110° C. |
| | Zinc Oxide | 3.0 | 0 min charging polymers |
| | Hydrocarbon Resin (tackifiers) | 2.0 | 0.5 min charging oil and Carbon Black |
| | Santoflex 13 (antioxidants) | 0.95 | 5.0 min drop sample for analysis |
| | Stearic Acid | 2.0 | |
| | Wax | 1.0 | |
| Final Batch | Sulfur | 1.3 | Initial Temperature 75° C. |
| | Cyclohexyl-benzothiazole | 1.4 | 0 sec charging master stock 30 sec charging |
| | Diphenylguanidine (accelerator) | 0.20 | curing agent and accelerators 1.25 min drop sample for analysis |

[1]Trade Name HX263 from Firestone Polymers [styrene 23.8%, vinyl 13%, cis 35%, trans 52%, and Mw 261 kg/mol, Mw/Mn 2.30]

TABLE 2

Silica-Filled Formulation

| | Composition | phr | Mixing Conditions |
|---|---|---|---|
| Master Batch | SBR[1] | 100 | Mixer: 300 g Brabender |
| | Precipitated silica filler (HISIL 190G) | 70 | Agitation Speed: 60 rpm Initial Temperature 110° C. |
| | Aromatic Oil | 30 | 0 min charging polymers |
| | Wax | 1.5 | 0.5 min charging oil |
| | Stearic Acid | 2.0 | and Silica |
| | Santoflex 13 (antioxidants) | 0.95 | 5.0 min drop |
| | Si 69 (Silane Coupling Agent) | 8 | |
| Remill Stage | | | Initial Temperature 110° C. 0 min charging stocks 5.0 min drop |
| Final Batch | N-(cyclohexylthio) phthalimide (retarder) | 0.25 | Initial Temperature 75° C. 0 sec charging master stock 30 sec charging curing |
| | Sulfur | 1.7 | agent and accelerators |
| | Zinc Oxide | 2.5 | 75 sec drop |
| | Cyclohexyl-benzothiazole sulfonamide (accelerator) | 1.50 | |
| | Diphenylguanidine (accelerator) | 0.5 | |

[1]Trade Name HX263 from Firestone Polymers [styrene 23.8%, vinyl 13%, cis 35%, trans 52%, and Mw 261 kg/mol, Mw/Mn 2.30]

TABLE 3

Properties Carbon Black-Filled Rubber Compositions with Nanoparticles

| | | Example | | | | | | | |
|---|---|---|---|---|---|---|---|---|---|
| | | 9 | 10 | 11 | 12 | 13 | 14 | 15 | 16 |
| Functionality | | Control | Pyridine (1) | Carbazole (2) | Imidazole (3) | Diethylamino-styrene (4) | Pyrrolidone (5) | Carbazole (6) | Pyrrolidone (7) |
| DYNASTAT (0'° C.) | K'* (lbf/in): | 273.554 | 469.583 | 424.529 | 469.981 | 428.610 | 419.288 | 451.645 | 689.207 |
| | K"* (lbf/in): | 75.921 | 131.896 | 118.751 | 129.382 | 120.846 | 114.539 | 122.879 | 163.698 |
| | tanδ: | 0.278 | 0.281 | 0.280 | 0.275 | 0.282 | 0.273 | 0.272 | 0.238 |
| DYNASTAT (50'° C.) | K' (lbf/in): | 143.397 | 182.920 | 174.747 | 177.977 | 174.218 | 169.874 | 181.227 | 244.313 |
| | K" (lbf/in): | 28.826 | 42.837 | 40.853 | 41.659 | 41.383 | 38.811 | 41.032 | 63.537 |
| | tanδ: | 0.201 | 0.234 | 0.234 | 0.234 | 0.238 | 0.228 | 0.226 | 0.260 |

TABLE 3-continued

Properties Carbon Black-Filled Rubber Compositions with Nanoparticles

| | | Example | | | | | | | |
|---|---|---|---|---|---|---|---|---|---|
| | | 9 | 10 | 11 | 12 | 13 | 14 | 15 | 16 |
| MOONEY (130° C.) | ML1 + 4 (MU) | 42.1 | 40.6 | 40.6 | 39.7 | 40.1 | 38.5 | 41.2 | 38.9 |
| RING TENSILE (100° C.) | M50 (MPa) | 0.9 | 0.94 | 0.95 | 0.96 | 0.96 | 0.98 | 0.99 | 0.94 |
| | M300 (MPa) | 6.11 | 6.45 | 6.68 | 6.54 | 6.44 | 6.66 | 6.68 | 6.07 |
| | Max Stress (MPa) | 8.4 | 8.91 | 9.31 | 9.68 | 8.93 | 8.5 | 9.23 | 8.98 |
| | Max Strain (%) | 380.5 | 387.8 | 390.0 | 412.0 | 392.6 | 365.5 | 389.4 | 413.3 |
| RING TENSILE (23° C.) | M50 (MPa) | 1.26 | 1.58 | 1.57 | 1.5 | 1.5 | 1.54 | 1.6 | 1.79 |
| | M300 (MPa) | 8.3 | 9.09 | 9.32 | 8.91 | 8.69 | 9.11 | 9.19 | 8.82 |
| | Max Stress (MPa) | 19.6 | 19.28 | 19.55 | 19.29 | 18.54 | 19.28 | 20.12 | 18.3 |
| | Max Strain (%) | 569.9 | 569.3 | 561.5 | 576.9 | 565.5 | 562.7 | 582.5 | 569.2 |
| STRAIN SWEEP (25° C.) | G' (MPa) @5%, 5 Hz: | 2.259 | 3.050 | 2.887 | 2.934 | 2.872 | 2.777 | 2.860 | 3.966 |
| | G" (MPa) @ 5%, 5 Hz: | 0.533 | 0.788 | 0.743 | 0.764 | 0.757 | 0.721 | 0.726 | 1.022 |
| | tanδ @ 5%, 5 Hz: | 0.236 | 0.258 | 0.257 | 0.260 | 0.264 | 0.260 | 0.254 | 0.258 |
| | ΔG' (MPa) [0.25-14%] | 2.146 | 3.800 | 3.407 | 3.590 | 3.545 | 3.271 | 3.257 | 5.561 |

*K' and K" are the dynamic compression modulus

TABLE 4

Properties of Silica-Filled Rubber Compositions with Nanoparticles

| | | Example | | | | | | | |
|---|---|---|---|---|---|---|---|---|---|
| | | 17 | 18 | 19 | 20 | 21 | 22 | 23 | 24 |
| Functionality | | Control | Pyridine (1) | Carbazole (2) | Imidazole (3) | Diethylamino-styrene (4) | Pyrrolidone (5) | Carbazole (6) | Pyrrolidone (7) |
| DYNASTAT (0'° C.) | K' (lbf/in): | 549.765 | 1100.815 | 847.814 | 846.947 | 870.433 | 888.472 | 883.497 | 1059.119 |
| | K" (lbf/in): | 119.826 | 214.393 | 176.802 | 179.159 | 180.841 | 182.438 | 180.149 | 198.185 |
| | tanδ: | 0.218 | 0.195 | 0.209 | 0.211 | 0.208 | 0.205 | 0.204 | 0.187 |
| DYNASTAT (50'° C.) | K' (lbf/in): | 269.790 | 342.708 | 325.480 | 310.518 | 321.890 | 331.227 | 331.882 | 377.295 |
| | K" (lbf/in): | 46.188 | 76.988 | 64.532 | 61.547 | 65.136 | 64.834 | 65.529 | 79.203 |
| | tanδ: | 0.171 | 0.225 | 0.198 | 0.198 | 0.202 | 0.196 | 0.197 | 0.210 |
| MOONEY (130° C.) | ML1 + 4 (MU) | 45.3 | 44.7 | 45.4 | 44.5 | 44.8 | 43.4 | 45.4 | 45.2 |
| RING TENSILE (100° C.) | M50 (MPa) | 1.0 | 1.11 | 1.17 | 1.14 | 1.13 | 1.14 | 1.17 | 1.14 |
| | M300 (MPa) | 5.85 | 6.09 | 6.83 | 6.71 | 6.50 | 6.53 | 6.89 | 6.56 |
| | Max Stress (MPa) | 9.33 | 9.44 | 11.62 | 11.04 | 10.39 | 11.92 | 12.06 | 11.95 |
| | Max Strain (%) | 422.6 | 423.2 | 450.4 | 440.5 | 430.4 | 470.6 | 460.4 | 473.1 |
| RING TENSILE (23° C.) | M50 (MPa) | 1.21 | 1.51 | 1.38 | 1.37 | 1.38 | 1.39 | 1.41 | 1.46 |
| | M300 (MPa) | 6.96 | 7.60 | 7.78 | 7.60 | 7.52 | 7.42 | 7.87 | 8.03 |
| | Max Stress (MPa) | 18.99 | 18.13 | 19.19 | 18.88 | 18.01 | 18.14 | 18.65 | 19.04 |
| | Max Strain (%) | 602.7 | 574.9 | 577.3 | 582.1 | 569.2 | 577.82 | 567.8 | 580.5 |
| STRAIN SWEEP (25° C.) | G' (MPa) @5%, 5 Hz: | 4.329 | 5.567 | 4.980 | 5.069 | 4.884 | 5.224 | 5.369 | 5.614 |
| | G" (MPa) @ 5%, 5 Hz: | 0.888 | 1.466 | 1.202 | 1.234 | 1.234 | 1.282 | 1.262 | 1.415 |
| | tanδ @ 5%, 5 Hz: | 0.205 | 0.263 | 0.241 | 0.243 | 0.253 | 0.245 | 0.235 | 0.252 |
| | ΔG' (MPa) [0.25-14%] | 4.865 | 8.875 | 7.079 | 7.346 | 7.389 | 7.841 | 7.867 | 9.230 |

Rubber Compounding Examples 5A-9A

Table 1A shows the general silica composition formulation. Example 9A below is a control example that uses the silica formulation listed in Table 1A. Examples 5A-8A are compounded according to the formulation of Table 1A except the nanoparticles of Examples 1A-4A were used to replace 15 phr of the SBR polymer. The 15 phr of nanoparticles accounted for 7% by weight of the silica-filled compositions. Table 2A summarizes the compound properties.

TABLE 1A

Silica Compound Formulation

| | Composition | phr | Mixing Conditions |
|---|---|---|---|
| Master Batch | SBR/Nanoparticles[1] | 100 | Mixer: 300 g Brabender |
| | Precipitated silica filler | 70 | Agitation Speed: 60 rpm |
| | Aromatic Oil | 30 | Initial Temperature |

TABLE 1A-continued

Silica Compound Formulation

| | Composition | phr | Mixing Conditions |
|---|---|---|---|
| | Wax | 1.5 | 110° C. |
| | Stearic Acid | 2.0 | 0 min charging |
| | Santoflex 13 (antioxidants) | 0.95 | polymers |
| | | | 0.5 min charging oil and |
| | Si 69 (Silane Coupling Agent) | 8 | silica |
| | | | 5.0 min drop |
| Remill Stage | | | Initial Temperature 110° C. |
| | | | 0 min charging stocks |
| | | | 5.0 min drop |
| Final Batch | Zinc Oxide | 2.5 | Initial Temperature 75° C. |
| | N-(cyclohexylthio) phthalimide (retarder) | 0.25 | 0 sec charging master stock |
| | Sulfur | 1.7 | 30 sec charging curing |
| | Cyclohexyl-benzothiazole sulfenamide (accelerator) | 1.50 | agent and accelerators 75 sec drop |
| | Diphenylguanidine (accelerator) | 0.5 | |

[1]SBR rade Name HX263 from Firestone Polymers [styrene 23.8%, vinyl 13%, cis 35%, trans 52%, and Mw 261 kg/mol, Mw/Mn 2.30]

TABLE 2A

Properties of Silica Filled Rubber Compositions with Nanoparticles

| | | Example | | | | |
|---|---|---|---|---|---|---|
| | | 5A | 6A | 7A | 8A | 9A |
| Functionality | | PEG (2A) | PDMS (3A) | PPO (4A) | none (1A) | Control |
| MOONEY (130° C.) | ML1 + 4 (MU): | 54 | 53.5 | 53.7 | 51.7 | 52 |
| | t5 (min): | 46.27 | 49.92 | 44.28 | 50.13 | 48.77 |
| R-TENSILE (100° C.) | M50 | 1.19 | 1.15 | 1.2 | 1.08 | 0.98 |
| | M300 | 8.3 | 7.54 | 8.09 | 6.57 | 6.08 |
| | Tb (MPa) | 7.83 | 8.31 | 8.7 | 7.37 | 8.35 |
| | Eb (%) | 293 | 335 | 324 | 335 | 385 |
| R-TENSILE (23° C.) | M50 | 1.67 | 1.56 | 1.72 | 1.62 | 1.22 |
| | M300 | 10.49 | 9.48 | 10.41 | 8.88 | 7.29 |
| | Tb (MPa) | 17.99 | 15.92 | 17.69 | 16.08 | 18.3 |
| | Eb (%) | 495 | 474 | 489 | 495 | 573 |
| STRAIN SWP (25° C.) 5%, 5 Hz | G' (MPa) | 5.04 | 4.72 | 4.91 | 5.16 | 3.93 |
| | G" (MPa) | 1.14 | 1.09 | 1.14 | 1.22 | 0.81 |
| | tanδ | 0.23 | 0.23 | 0.23 | 0.24 | 0.21 |
| 5 Hz, [0.14-15%] | ΔG' (MPa) | 6.35 | 5.86 | 6.36 | 7.06 | 4.04 |
| TEMP SWP | $T_g$ (° C.) | −42 | −42 | −41 | −42 | −43 |
| WET TRACTION | STANLEY LONDON | 66 | 64 | 66 | 66 | 64 |

Example 3B-5B

Rubber Compounding

Nanoparticles with castor oil brushes were synthesized as discussed in Example 2B and compounded in an SBR rubber matrix with silica filler. Examples with no nanoparticles and unfunctionalized nanoparticles were also compounded.

In Example 3B, a 100 phr matrix of HX263 SBR was used as a control. In Example 4B, the unfunctionalized nanoparticles synthesized in Example 1B replaced 15 parts of the SBR matrix polymer (7 wt. % based on the total compound). In Example 5B the nanoparticles with a castor oil shell (brushes) replaced 15 parts of the SBR matrix polymer (7 wt. % based on the total compound).

Table 1B shows the rubber and silica compound formulation. Table 2B summarizes the compound properties.

TABLE 1B

Silica Compound Formulation

| | Composition | phr | Mixing Conditions |
|---|---|---|---|
| Master Batch | SBR/nanoparticles[1] | 100 | Mixer: 300 g Brabender |
| | Precipitated silica filler | 70 | Agitation Speed: 60 rpm |
| | Aromatic Oil | 30 | Initial Temperature 110° C. |
| | Wax | 1.5 | 0 min charging polymers |
| | Stearic Acid | 2.0 | 0.5 min charging oil and |
| | Santoflex 13 (antioxidants) | 0.95 | silica |
| | Si 69 (Silane Coupling Agent) | 8 | 5.0 min drop |
| Remill Stage | | | Initial Temperature 110° C. |
| | | | 0 min charging stocks |
| | | | 5.0 min drop |
| Final Batch | Sulfur | 1.7 | Initial Temperature 75° C. |
| | N-(cyclohexylthio) phthalimide (retarder) | 0.25 | 0 sec charging master stock 30 sec charging curing |
| | Zinc Oxide | 2.5 | agent and accelerators |
| | Cyclohexyl-benzothiazole sulfenamide (accelerator) | 1.50 | 75 sec drop |
| | Diphenylguanidine (accelerator) | 0.5 | |

[1]SBR Trade Name HX263 from Firestone Polymers [styrene 23.8%, vinyl 13%, cis 35%, trans 52%, and Mw 261 kg/mol, Mw/Mn 2.30]

TABLE 2B

Properties of Silica Filled Rubber Compositions with Nanoparticles

| | EXAMPLE: | | |
|---|---|---|---|
| | 3B | 4B | 5B |
| Nanoparticles (15 phr) | 0 | 1B | 2B |
| Brushes | | none | castor oil |
| MOONEY (130° C.) | | | |
| ML1 + 4 (MU): | 44.6 | 50.9 | 51 |
| RING TENSILE (100° C.) | | | |
| M50 (MPa) | 0.97 | 0.93 | 1.08 |
| M300 (MPa) | 5.78 | 5.76 | 6.79 |
| Max Stress (MPa) | 7.52 | 7.49 | 8.68 |
| Max Strain (%) | 365.0 | 369.0 | 364.0 |
| RING TENSILE (23° C.) | | | |
| M50 (MPa) | 1.16 | 1.26 | 1.35 |
| M300 (MPa) | 6.84 | 7.06 | 7.89 |
| Max Stress (MPa) | 17.5 | 15.8 | 16.3 |
| Max Strain (%) | 569.0 | 530.0 | 501.0 |
| SHORE A HARDNESS | | | |
| Shore A at 25 C.: | 57.3 | 57.8 | 55.8 |
| Shore A at 100 C.: | 52.6 | 52.6 | 52.6 |
| STRAIN SWEEP (25° C.) | | | |
| G' (MPa) @ 5%, 5 Hz: | 4.239 | 4.874 | 4.356 |
| G" (MPa) @ 5%, 5 Hz: | 0.839 | 1.315 | 1.124 |
| tanδ @ 5%, 5 Hz: | 0.198 | 0.270 | 0.258 |
| ΔG' (MPa) [0.25-14%] | 4.395 | 5.576 | 4.184 |
| DYNASTAT (0'° C., FINAL) | | | |
| % Displacement: | 1.641 | 0.957 | 0.940 |
| K' (lbf/in): | 538.595 | 922.927 | 935.560 |
| K" (lbf/in): | 116.288 | 198.960 | 218.603 |
| tanδ: | 0.216 | 0.216 | 0.234 |
| DYNASTAT (50'° C., FINAL) | | | |
| % Displacement: | 3.235 | 3.592 | 3.518 |
| K' (lbf/in): | 275.349 | 246.581 | 253.019 |
| K" (lbf/in): | 46.569 | 50.568 | 44.122 |
| tanδ | 0.169 | 0.205 | 0.174 |

This written description sets forth the best mode of the invention, and describes the invention so as to enable a person skilled in the art to make and use the invention by presenting certain embodiments. The patentable scope of the invention is defined by the claims, and may include other embodiments that occur to those skilled in the art.

We claim:

1. A method for synthesizing a core-shell particle, comprising the steps of:
   synthesizing a polymeric seed in a solvent by living anionic dispersion polymerization, the polymeric seed including mono-vinyl monomer units cross-linked with a cross-linking agent to form the core of the nanoparticle, the core having an average diameter of about 5 nanometers to about 10,000 nanometers, and the seed having polymer chains with living ends;
   adding a stabilizer to stabilize the seed and prevent the seed from precipitating out of solution; and
   grafting and/or polymerizing a shell species onto the living ends of the seed to form the shell of the particle;
   wherein the seed is formed by polymerizing the mono-vinyl monomer using an initiator, and cross-linking the resulting polymer with a multiple-vinyl monomer cross-linking agent.

2. The method of claim 1 wherein the shell species is a preformed polymer.

3. The method of claim 1 wherein the cross-linking agent and an anionic initiator are added in one charge to the hydrocarbon solvent, mono-vinyl aromatic monomer, and stabilizer.

4. The method of claim 1, wherein the solvent comprises a hydrocarbon solvent.

5. The method of claim 1, further comprising the step of adding a functional terminator to terminate the living ends of the shell.

6. The method of claim 1, wherein the core has an average diameter of from about 50 nanometers to about 125 nanometers.

7. The method of claim 1, wherein the shell species is selected from the group consisting of polyvinyl, polyurethane, polyester, polyether, polyimide, polyamine, poly(carbonate), poly(epoxide), poly(siloxane), and polyvinyl alcohol.

8. The method of claim 1, wherein the shell species contains a heteroatomic species selected from the group consisting of O, N, S, P, halogens, Ti, and Si.

9. The method of claim 1 wherein the shell species is a functional oligomer or macromolecule, or a functional terminator that includes a heteroatom.

10. The method of claim 1 wherein the shell species is a synthetic oil, a fatty acid ester, triglycerides, or a vegetable oil.

11. A method for making a rubber composition, the method comprising:
   synthesizing a core-shell particle, the steps of which comprise:
      synthesizing a polymeric seed in a solvent by living dispersion polymerization, the polymeric seed including mono-vinyl monomer units cross-linked with a cross-linking agent to form the core of the nanoparticle, the core having an average diameter of about 5 nanometers to about 10,000 nanometers, and the seed having polymer chains with living ends;
      adding a stabilizer to stabilize the seed and prevent the seed from precipitating out of solution; and
      grafting and/or polymerizing a shell species onto the living ends of the seed to form the shell of the particle; and
   adding the core-shell particle to a vulcanizable rubber matrix.

12. A method for making a tire, the method comprising:
synthesizing a core-shell particle, the steps of which comprise:
   synthesizing a polymeric seed in a solvent by living dispersion polymerization, the polymeric seed including mono-vinyl monomer units cross-linked with a cross-linking agent to form the core of the nanoparticle, the core having an average diameter of about 5 nanometers to about 10,000 nanometers, and the seed having polymer chains with living ends;
   adding a stabilizer to stabilize the seed and prevent the seed from precipitating out of solution; and
   grafting and/or polymerizing a shell species onto the living ends of the seed to form the shell of the particle;
adding the core-shell particle to a rubber composition;
molding the rubber composition into a tire tread; and
constructing a tire including the tire tread.

13. The method of claim 1, wherein a Tg of the core is higher than a Tg of the shell.

14. The method of claim 1, wherein the core has an average diameter of from about 5 nanometers to about 50 nanometers.

15. The method of claim 1, wherein the particles have a ratio Mw to Mn of 1.3 or less.

16. The method of claim 11, wherein the shell species is a synthetic oil, a fatty acid ester, triglycerides, or a vegetable oil.

17. The method of claim 11, wherein a Tg of the core is higher than a Tg of the shell.

18. The method of claim 11, wherein the core has an average diameter of from about 5 nanometers to about 50 nanometers.

19. The method of claim 11, wherein the particles have a ratio Mw to Mn of 1.3 or less.

20. The method of claim 11 further comprising the step of polymerizing the shell species using an anionic initiator.

21. The method of claim 12, wherein the shell species is a synthetic oil, a fatty acid ester, triglycerides, or a vegetable oil.

22. The method of claim 12, wherein a Tg of the core is higher than a Tg of the shell.

23. The method of claim 12, wherein the core has an average diameter of from about 5 nanometers to about 50 nanometers.

24. The method of claim 12, wherein the particles have a ratio Mw to Mn of 1.3 or less.

25. The method of claim 12 further comprising the step of polymerizing the shell species using an anionic initiator.

* * * * *